(12) United States Patent
Pang et al.

(10) Patent No.: US 10,305,684 B2
(45) Date of Patent: May 28, 2019

(54) SECURE CONNECTION METHOD FOR NETWORK DEVICE, RELATED APPARATUS, AND SYSTEM

(71) Applicant: Huawei Device Co., Ltd., Dongguan, Guangdong (CN)

(72) Inventors: Gaokun Pang, Shenzhen (CN); Zhiming Ding, Shenzhen (CN); Xiaoxian Li, Shenzhen (CN); Su Lu, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 222 days.

(21) Appl. No.: 15/197,041

(22) Filed: Jun. 29, 2016

(65) Prior Publication Data

US 2017/0099137 A1 Apr. 6, 2017

Related U.S. Application Data

(63) Continuation of application No. PCT/CN2013/091237, filed on Dec. 31, 2013.

(51) Int. Cl.
*H04L 9/08* (2006.01)
*H04L 9/32* (2006.01)
*H04L 29/06* (2006.01)

(52) U.S. Cl.
CPC .......... *H04L 9/0825* (2013.01); *H04L 9/0863* (2013.01); *H04L 9/3215* (2013.01); *H04L 9/3239* (2013.01); *H04L 9/3247* (2013.01); *H04L 63/00* (2013.01); *H04L 63/0428* (2013.01); *H04L 63/0435* (2013.01); *H04L 63/06* (2013.01)

(58) Field of Classification Search
None
See application file for complete search history.

(56) References Cited

U.S. PATENT DOCUMENTS

| | | | |
|---|---|---|---|
| 7,039,713 B1 | 5/2006 | Van Gunter et al. | |
| 7,234,063 B1* | 6/2007 | Baugher | H04L 9/0833 380/259 |
| 2004/0143735 A1* | 7/2004 | Ferguson | H04W 12/02 713/153 |

(Continued)

FOREIGN PATENT DOCUMENTS

| | | | | |
|---|---|---|---|---|
| CN | 1964258 A | | 5/2007 | |
| CN | 1980120 | * | 6/2007 | ............. H04L 12/28 |

(Continued)

*Primary Examiner* — Sharon S Lynch

(57) ABSTRACT

A secure connection method for a network device includes: acquiring a public key operation value of a second device in an out-of-band manner; sending public key information of a first device to the second device; receiving public key information of the second device that is sent by the second device, and decrypting the public key information of the second device by using a private key of the first device, to obtain the public key of the second device; and performing a preset-algorithm operation on the public key of the second device to obtain a copy of the public key operation value of the second device, and after the copy of the public key operation value of the second device matches the public key operation value of the second device, accepting received connection information sent by the second device.

15 Claims, 24 Drawing Sheets

(56) References Cited

U.S. PATENT DOCUMENTS

| | | | | |
|---|---|---|---|---|
| 2007/0079362 A1* | 4/2007 | Lortz | .................. | H04L 63/0807 726/5 |
| 2007/0136800 A1* | 6/2007 | Chan | .................... | H04L 9/3236 726/10 |
| 2008/0005562 A1 | 1/2008 | Sather et al. | | |
| 2009/0318114 A1* | 12/2009 | Bertoni | ................ | H04L 9/0841 455/410 |
| 2010/0333186 A1* | 12/2010 | Chan | .................... | H04L 9/3236 726/10 |
| 2012/0084568 A1* | 4/2012 | Sarikaya | ............... | H04L 9/3066 713/176 |
| 2012/0148044 A1 | 6/2012 | Fang et al. | | |
| 2012/0209749 A1* | 8/2012 | Hammad | ............... | G06Q 30/06 705/27.1 |
| 2012/0308003 A1* | 12/2012 | Mukherjee | ............ | H04L 9/3247 380/243 |
| 2012/0309348 A1* | 12/2012 | De Atley | ................ | H04L 63/08 455/410 |
| 2014/0237256 A1* | 8/2014 | Ben Ayed | ............. | H04W 12/04 713/186 |
| 2015/0271667 A1* | 9/2015 | Bernsen | .................. | H04L 63/06 713/171 |
| 2016/0149708 A1* | 5/2016 | Garcia Morchon | .. | H04L 9/3247 713/176 |
| 2017/0005792 A1* | 1/2017 | Rietman | ............... | H04L 9/0838 |
| 2017/0237561 A1* | 8/2017 | Nix | ....................... | H04L 9/3066 713/156 |
| 2017/0339132 A1* | 11/2017 | Araki | .................... | H04W 12/02 |
| 2017/0373845 A1* | 12/2017 | Nix | ......................... | H04W 4/70 |

FOREIGN PATENT DOCUMENTS

| | | | | |
|---|---|---|---|---|
| CN | 1980120 A | | 6/2007 | |
| CN | 101114901 | * | 1/2008 | ............... H04B 5/00 |
| CN | 101114901 A | | 1/2008 | |
| CN | 101997679 A | | 3/2011 | |
| CN | 103391540 A | | 11/2013 | |

\* cited by examiner

SECURE CONNECTION METHOD FOR NETWORK DEVICE, RELATED APPARATUS, AND SYSTEM

CROSS-REFERENCE TO RELATED APPLICATIONS

This application is a continuation of International Application No. PCT/CN2013/091237, filed on Dec. 31, 2013, which is hereby incorporated by reference in its entirety.

TECHNICAL FIELD

The present invention relates to the field of communications, and in particular, to a secure connection method for a network device, a related apparatus, and a system.

BACKGROUND

Wireless Fidelity (Wi-Fi) is a widely applied wireless communications technology, has advantages of fast deployment, convenience for use, high-rate transmission, and the like, and is widely applied in various industries. Access points of Wi-Fi networks spread all over venues such as hotels, cafes, schools, and hospitals, or in other words, Wi-Fi exists everywhere in life.

Although Wi-Fi networks are increasingly popular, due to complex Wi-Fi network setup, an equipment vendor still needs to invest a lot of support costs to help a user to establish a Wi-Fi network and solve a problem in a use process. Among users who successfully set up wireless networks, still 60% to 70% of the users do not configure any security parameter, and therefore, the networks are vulnerable to attacks. To solve bewilderment of the users in using the wireless networks, the Wi-Fi Alliance releases a Wi-Fi security setup (Wi-Fi Protected Setup, WPS) specification, also referred to as a Wi-Fi Simple Configuration (WSC), which is intended to simplify an operation when a user sets up a wireless local area network (WLAN). Therefore, users who have little understanding about wireless setup and security may also set up a secure WLAN simply and conveniently, and may add a device to the network conveniently.

A scenario of a current WPS application includes: a terminal used as an enrollee and an access point (AP) used as a registrar in a WiFi network perform a credential configuration, so that subsequently the terminal and the AP can perform authentication based on the credential to establish a secure connection. Specifically, a device to be connected such as an AP provides information including a complete public key of the AP; after another device such as a terminal acquires the information of the complete public key of the AP by using an out-of-band channel (out of band) (namely, another channel than a Wi-Fi channel), namely, an out-of-band manner, the another device sends, to the AP, connection information that is encrypted by using the complete public key of the AP; the AP decrypts the connection information by using its own private key; and based on the connection information, the AP and the anther device complete a configuration and establish a secure network connection.

To ensure security of the network connection after the configuration and connection, the used public key must be long enough, with a length of about 192 bytes=1536 bits. Therefore, because the complete public key is included, information provided by the device to be connected becomes intensive and complex, and out-of-band channel bandwidths of two devices that need to be connected are limited; messages exchanged in the connection process are numerous and complex, or content of exchanged messages is excessively large, which may cause low connection efficiency and bring poor network connection experience to users.

SUMMARY

A technical problem to be solved by embodiments of the present invention is to provide a secure connection method for a network device, a related apparatus, and a system, which simplify a network connection procedure, improve security of a connection, and improve connection experience of a user greatly.

According to a first aspect, an embodiment of the present invention provides a secure connection method for a network device, including:

acquiring, by a first device, a public key operation value of a second device in an out-of-band manner, where the public key operation value of the second device is a value obtained by performing a preset-algorithm operation on a public key of the second device;

sending, by the first device, public key information of the first device to the second device, so that the second device obtains a public key of the first device according to the public key information of the first device;

receiving, by the first device, public key information of the second device that is encrypted by using the public key of the first device and sent by the second device, and decrypting the encrypted public key information of the second device by using a private key of the first device, to obtain the public key of the second device; and performing, by the first device, a preset-algorithm operation on the public key of the second device to obtain a copy of the public key operation value of the second device, and when the copy of the public key operation value of the second device matches the public key operation value of the second device, accepting received connection information sent by the second device, or generating connection information and sending the connection information to the second device.

With reference to the first aspect, in a first possible implementation manner, when receiving the public key information of the second device that is encrypted by using the public key of the first device and sent by the second device, the first device further receives signature verification information sent by the second device, where the signature verification information is information obtained by the second device by performing asymmetric encryption on agreed information by using a private key of the second device, where the agreed information may be the public key information of the second device, or content of a sent message, or digest information, or the like.

With reference to the first possible implementation manner of the first aspect, in a second possible implementation manner, after the copy of the public key operation value of the second device matches the public key operation value of the second device, the method further includes:

verifying the signature verification information by using the public key of the second device; and if the verification succeeds, performing the step of accepting received connection information sent by the second device, or generating connection information and sending the connection information to the second device; or if the verification fails, terminating a connection process.

With reference to the first aspect, or the first possible implementation manner of the first aspect, or the second possible implementation manner of the first aspect, in a third possible implementation manner, the public key information of the first device includes the public key of the first device, or information obtained by performing symmetric encryption on the public key of the first device by using the public key operation value of the second device.

With reference to the first aspect, or the first possible implementation manner of the first aspect, or the second possible implementation manner of the first aspect, in a fourth possible implementation manner, before the sending, by the first device, public key information of the first device to the second device, the method further includes: acquiring, by the first device, random password information of the second device in the out-of-band manner, where the public key information of the first device includes the public key of the first device, or information obtained by performing symmetric encryption on the public key of the first device by using the public key operation value of the second device, or information obtained by performing symmetric encryption on the public key of the first device by using the public key operation value of the second device and the random password information of the second device, or information obtained by performing symmetric encryption on the public key of the first device by using the random password information of the second device.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, when receiving the public key information of the second device that is encrypted by using the public key of the first device and sent by the second device, the first device further receives the connection information generated by the second device, where asymmetric encryption is performed on the connection information by using the public key of the first device; and the accepting received connection information sent by the second device includes: decrypting the connection information by using the private key of the first device.

With reference to the first aspect, or the first possible implementation manner of the first aspect, or the second possible implementation manner of the first aspect, or the third possible implementation manner of the first aspect, in a sixth possible implementation manner, after the receiving, by the first device, public key information of the second device that is encrypted by using the public key of the first device and sent by the second device, the method further includes: receiving, by the first device, the connection information sent by the second device, where asymmetric encryption is performed on the connection information by using the public key of the first device; and the accepting received connection information sent by the second device includes: decrypting the connection information by using the private key of the first device.

With reference to the sixth possible implementation manner of the first aspect, in a seventh possible implementation manner, after the copy of the public key operation value of the second device matches the public key operation value of the second device, and before the connection information sent by the second device is received, the method further includes:

using the public key of the second device to perform an asymmetric encryption operation on the public key operation value of the second device or on a signature that is generated by using the private key of the first device, to generate a first verification message, and sending the first verification message to the second device, so that the second device sends the connection information after successfully verifying the first verification message.

With reference to the fourth possible implementation manner of the first aspect, in an eighth possible implementation manner, after the receiving, by the first device, public key information of the second device that is encrypted by using the public key of the first device and sent by the second device, the method further includes: receiving, by the first device, the connection information sent by the second device, where asymmetric encryption is performed on the connection information by using the public key of the first device; and the accepting received connection information sent by the second device includes: decrypting the connection information by using the private key of the first device.

With reference to the eighth possible implementation manner of the first aspect, in a ninth possible implementation manner, after the copy of the public key operation value of the second device matches the public key operation value of the second device, and before the connection information sent by the second device is received, the method further includes:

using the public key of the second device to perform an asymmetric encryption operation on the public key operation value of the second device and/or on the random password information of the second device to generate a second verification message, or using the public key of the second device to perform an asymmetric encryption operation on a signature that is generated by using the private key of the first device, to generate a second verification message, and sending the second verification message to the second device, so that the second device sends the connection information after successfully verifying the second verification message.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, in a tenth possible implementation manner, the method further includes: acquiring, by the first device, a public key operation value of a third device in the out-of-band manner, where the public key operation value of the third device is a value obtained by performing a preset-algorithm operation on a public key of the third device; and after completing a network connection with the second device, sending the public key operation value of the third device to the second device, so that the second device performs a network connection with the third device.

According to a second aspect, an embodiment of the present invention provides a secure connection method for a network device, including:

generating, by a second device, a public key operation value of the second device, for acquisition by a first device in an out-of-band manner, where the public key operation value of the second device is a value obtained by performing a preset-algorithm operation on a public key of the second device;

receiving, by the second device, public key information of the first device that is sent by the first device, acquiring a public key of the first device from the public key information of the first device, and performing asymmetric encryption on the public key of the second device by using the public key of the first device, to generate public key information of the second device; and sending, by the second device, the public key information of the second device to the first device, so that after the first device obtains the public key of the second device, the first device performs a preset-algorithm operation on the public key of the second device to obtain a copy of the public key operation value of the second device, and that after the copy of the public key operation value of the second device matches the public key operation value of the second device, the first device accepts received connection information sent by the second device, or generates connection information and sends the connection information to the second device.

With reference to the second aspect, in a first possible implementation manner, when sending the public key information of the second device, the second device further sends signature verification information generated according to a private key of the second device, so that after the first device detects that the copy of the public key operation value of the second device matches the public key operation value of the second device, the first device verifies the signature verification information by using the public key of the second device.

With reference to the second aspect or the first possible implementation manner of the second aspect, in a second possible implementation manner, the acquiring a public key of the first device from the public key information of the first device includes:

when the public key information of the first device is the public key of the first device, directly acquiring the public key of the first device; and when the public key information of the first device is information obtained by the first device by performing symmetric encryption on the public key of the first device by using the public key operation value of the second device, decrypting the public key information of the first device according to the public key operation value of the second device to acquire the public key of the first device.

With reference to the second aspect, or the first possible implementation manner of the second aspect, in a third possible implementation manner, before the receiving, by the second device, public key information of the first device that is sent by the first device, the method further includes: generating random password information of the second device, for acquisition by the first device in the out-of-band manner.

With reference to the third possible implementation manner of the second aspect, in a fourth possible implementation manner, the acquiring a public key of the first device from the public key information of the first device includes:

when the public key information of the first device is the public key of the first device, directly acquiring the public key of the first device;

when the public key information of the first device is information obtained by the first device by performing symmetric encryption on the public key of the first device by using the public key operation value of the second device, decrypting the public key information of the first device according to the public key operation value of the second device to acquire the public key of the first device;

when the public key information of the first device is information obtained by the first device by performing symmetric encryption on the public key of the first device by using the random password information of the second device, decrypting the public key information of the first device according to the random password information of the second device to acquire the public key of the first device; and when the public key information of the first device is information obtained by the first device by performing symmetric encryption on the public key of the first device by using the public key operation value of the second device and the random password information of the second device, decrypting the public key information of the first device according to the public key operation value of the second device and the random password information of the second device to acquire the public key of the first device.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, when sending the public key information of the second device to the first device, the second device further sends the connection information, where asymmetric encryption is performed on the connection information by using the public key of the first device.

With reference to the second aspect, or the first possible implementation manner of the second aspect, or the second possible implementation manner of the second aspect, in a sixth possible implementation manner, after the sending, by the second device, the public key information of the second device to the first device, the method further includes:

generating the connection information, where asymmetric encryption is performed on the connection information by using the public key of the first device; and sending the connection information to the first device.

With reference to the sixth possible implementation manner of the second aspect, in a seventh possible implementation manner, after the sending, by the second device, the public key information of the second device to the first device, and before the generating the connection information, the method further includes:

receiving a first verification message sent by the first device, where the first verification message is generated by the first device by performing an asymmetric encryption operation on the public key operation value of the second device by using the public key of the second device; and after successfully verifying the first verification message according to the private key of the second device, performing the step of generating the connection information; and confirming that the connection information takes effect.

With reference to the third possible implementation manner of the second aspect, or the fourth possible implementation manner of the second aspect, in an eighth possible implementation manner, after the sending, by the second device, the public key information of the second device to the first device, the method further includes:

generating the connection information, where asymmetric encryption is performed on the connection information by using the public key of the first device; and sending the connection information to the first device.

With reference to the eighth possible implementation manner of the second aspect, in a ninth possible implementation manner, after the sending, by the second device, the public key information of the second device to the first device, and before the generating the connection information, the method further includes:

receiving a second verification message sent by the first device, where the second verification message is generated by the first device by performing an asymmetric encryption operation on the public key operation value of the second device and/or the random password information of the second device by using the public key of the second device, or is generated by performing an asymmetric encryption operation by using the public key of the second device, on a signature that is generated by using a private key of the first device; and after successfully verifying the second verification message according to the private key of the second device, performing the step of generating the connection information; and confirming that the connection information takes effect.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, or the ninth possible implementation manner of the second aspect, in a tenth possible implementation manner, the method includes: after the second device completes a network connection with the first device, receiving a public key operation value of a third device that is sent by the first device, where the public key operation value of the third device is a value obtained by performing a preset-algorithm operation on a public key of the third device; and performing a network connection with the third device.

According to a third aspect, an embodiment of the present invention provides a secure connection apparatus for a network device, including:

a first out-of-band acquiring module, configured to acquire a public key operation value of a second device in an out-of-band manner, where the public key operation value of the second device is a value obtained by performing a preset-algorithm operation on a public key of the second device;

a first sending module, configured to send public key information of a first device to the second device, so that the second device obtains a public key of the first device according to the public key information of the first device;

a first receiving module, configured to receive public key information of the second device that is encrypted by using the public key of the first device and sent by the second device, and decrypt the encrypted public key information of the second device by using a private key of the first device, to obtain the public key of the second device;

an operation module, configured to perform a preset-algorithm operation on the public key of the second device to obtain a copy of the public key operation value of the second device; and a match processing module, configured to: when matching the copy of the public key operation value of the second device with the public key operation value of the second device, accept received connection information sent by the second device, or generate connection information and send the connection information to the second device.

With reference to the third aspect, in a first possible implementation manner, when receiving the public key information of the second device that is encrypted by using the public key of the first device and sent by the second device, the first receiving module further receives signature verification information sent by the second device, where the signature verification information is information obtained by the second device by performing asymmetric encryption by using a private key of the second device.

With reference to the first possible implementation manner of the third aspect, in a second possible implementation manner, the apparatus further includes:

a signature verification module, configured to verify the signature verification information by using the public key of the second device; and a signature verification processing module, configured to: if the verification by the signature verification module succeeds, perform the step of accepting received connection information sent by the second device, or generating connection information and sending the connection information to the second device; or if the verification by the signature verification module fails, terminate a connection process.

With reference to the third aspect, or the first possible implementation manner of the third aspect, or the second possible implementation manner of the third aspect, in a third possible implementation manner, the public key information of the first device includes the public key of the first device, or information obtained by performing symmetric encryption on the public key of the first device by using the public key operation value of the second device.

With reference to the third aspect, or the first possible implementation manner of the third aspect, or the second possible implementation manner of the third aspect, in a fourth possible implementation manner, the apparatus further includes:

a second out-of-band acquiring module, configured to acquire random password information of the second device in the out-of-band manner, where the public key information of the first device includes the public key of the first device, or information obtained by performing symmetric encryption on the public key of the first device by using the public key operation value of the second device, or information obtained by performing symmetric encryption on the public key of the first device by using the public key operation value of the second device and the random password information of the second device, or information obtained by performing symmetric encryption on the public key of the first device by using the random password information of the second device.

With reference to the third aspect, or the first possible implementation manner of the third aspect, or the second possible implementation manner of the third aspect, or the third possible implementation manner of the third aspect, or the fourth possible implementation manner of the third aspect, in a fifth possible implementation manner, when receiving the public key information of the second device, the first receiving module further receives the connection information generated by the second device, where asymmetric encryption is performed on the connection information by using the public key of the first device; and the apparatus further includes a connection information decryption module, configured to decrypt the connection information by using the private key of the first device.

With reference to the third aspect, or the first possible implementation manner of the third aspect, or the second possible implementation manner of the third aspect, or the third possible implementation manner of the third aspect, in a sixth possible implementation manner, the apparatus further includes:

a second receiving module, configured to: after the first receiving module receives the public key information of the second device that is encrypted by using the public key of the first device and sent by the second device, receive the connection information sent by the second device, where asymmetric encryption is performed on the connection information by using the public key of the first device; and a connection information decryption module, configured to decrypt the connection information by using the private key of the first device.

With reference to the sixth possible implementation manner of the third aspect, in a seventh possible implementation manner, the apparatus further includes:

a first verification message generation module, configured to: after the match processing module matches the copy of the public key operation value of the second device with the public key operation value of the second device, and before the second receiving module receives the connection information sent by the second device, use the public key of the second device to perform an asymmetric encryption operation on the public key operation value of the second device or on a signature that is generated by using the private key of the first device, to generate a first verification message; and a second sending module, configured to send the first verification message to the second device.

With reference to the fourth possible implementation manner of the third aspect, in an eighth possible implementation manner, the apparatus further includes:

a third receiving module, configured to: after the first receiving module receives the public key information of the second device that is encrypted by using the public key of the first device and sent by the second device, receive the connection information sent by the second device, where asymmetric encryption is performed on the connection information by using the public key of the first device; and a connection information decryption module, configured to decrypt the connection information by using the private key of the first device.

With reference to the eighth possible implementation manner of the third aspect, in a ninth possible implementation manner, the apparatus further includes:

a second verification message generation module, configured to: after the match processing module matches the copy of the public key operation value of the second device with the public key operation value of the second device, and before the third receiving module receives the connection information sent by the second device, use the public key of the second device to perform an asymmetric encryption operation on the public key operation value of the second device and/or on the random password information of the second device to generate a second verification message, or use the public key of the second device to perform an asymmetric encryption operation on a signature that is generated by using the private key of the first device, to generate a second verification message; and a third sending module, configured to send the second verification message to the second device.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the ninth possible implementation manner of the third aspect, in a tenth possible implementation manner, the apparatus further includes:

a third out-of-band acquiring module, configured to acquire a public key operation value of a third device in the out-of-band manner, where the public key operation value of the third device is a value obtained by performing a preset-algorithm operation on a public key of the third device; and a fourth sending module, configured to: after completing a network connection with the second device, send the public key operation value of the third device to the second device, so that the second device performs a network connection with the third device.

According to a fourth aspect, an embodiment of the present invention provides a secure connection device for a network device, including:

a public key operation value generation module, configured to generate a public key operation value of a second device, for acquisition by a first device in an out-of-band manner, where the public key operation value of the second device is a value obtained by performing a preset-algorithm operation on a public key of the second device;

a receiving and acquiring module, configured to receive public key information of the first device that is sent by the first device, and acquire a public key of the first device from the public key information of the first device;

a public key information generation module, configured to perform asymmetric encryption on the public key of the second device by using the public key of the first device, to generate public key information of the second device; and a fifth sending module, configured to send the public key information of the second device to the first device, so that after the first device obtains the public key of the second device, the first device performs a preset-algorithm operation on the public key of the second device to obtain a copy of the public key operation value of the second device, and that after the copy of the public key operation value of the second device matches the public key operation value of the second device, the first device accepts received connection information sent by the second device, or generates connection information and sends the connection information to the second device.

With reference to the fourth aspect, in a first possible implementation manner, the device further includes:

a signature verification generation module, configured to generate signature verification information according to a private key of the second device, where the fifth sending module further sends the signature verification information when sending the public key information of the second device, so that after the first device detects that the copy of the public key operation value of the second device matches the public key operation value of the second device, the first device verifies the signature verification information by using the public key of the second device.

With reference to the fourth aspect or the first possible implementation manner of the fourth aspect, in a second possible implementation manner, the receiving and acquiring module includes:

a first acquiring unit, configured to: when the public key information of the first device is the public key of the first device, directly acquire the public key of the first device; and/or a second acquiring unit, configured to: when the public key information of the first device is information obtained by the first device by performing symmetric encryption on the public key of the first device by using the public key operation value of the second device, decrypt the public key information of the first device according to the public key operation value of the second device to acquire the public key of the first device.

With reference to the fourth aspect or the first possible implementation manner of the fourth aspect, in a third possible implementation manner, the device further includes:

a random password generation module, configured to: before the receiving and acquiring module receives the public key information of the first device that is sent by the first device, generate random password information of the second device, for acquisition by the first device in the out-of-band manner.

With reference to the third possible implementation manner of the fourth aspect, in a fourth possible implementation manner, the receiving and acquiring module includes:

a first acquiring unit, configured to: when the public key information of the first device is the public key of the first device, directly acquire the public key of the first device; and/or a second acquiring unit, configured to: when the public key information of the first device is information obtained by the first device by performing symmetric encryption on the public key of the first device by using the public key operation value of the second device, decrypt the public key information of the first device according to the public key operation value of the second device to acquire the public key of the first device; and/or a third acquiring unit, configured to: when the public key information of the first device is information obtained by the first device by performing symmetric encryption on the public key of the first device by using the random password information of the second device, decrypt the public key information of the first device according to the random password information of the second device to acquire the public key of the first device; and/or a fourth acquiring unit, configured to: when the public key information of the first device is information obtained by the first device by performing symmetric encryption on the public key of the first device by using the public key operation value of the second device and the random password information of the second device, decrypt the public key information of the first device according to the public key operation value of the second device and the random password information of the second device to acquire the public key of the first device.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, in a fifth possible implementation manner, the device further includes:

a connection information generation module, configured to generate the connection information, where asymmetric encryption is performed on the connection information by using the public key of the first device, where the fifth sending module further sends the connection information when sending the public key information of the second device to the first device.

With reference to the fourth aspect, or the first possible implementation manner of the fourth aspect, or the second possible implementation manner of the fourth aspect, in a sixth possible implementation manner, the device further includes:

a first connection information generation module, configured to: after the fifth sending module sends the public key information of the second device to the first device, generate the connection information, where asymmetric encryption is performed on the connection information by using the public key of the first device; and a first connection information sending module, configured to send the connection information to the first device.

With reference to the sixth possible implementation manner of the fourth aspect, in a seventh possible implementation manner, the device further includes:

a fourth receiving module, configured to: after the fifth sending module sends the public key information of the second device to the first device, and before the first connection information generation module generates the connection information, receive a first verification message sent by the first device, where the first verification message is generated by the first device by performing an asymmetric encryption operation on the public key operation value of the second device by using the public key of the second device; and a first verification and confirmation module, configured to: after successfully verifying the first verification message according to the private key of the second device, trigger the first connection information generation module to generate the connection information; and confirm that the connection information takes effect.

With reference to the third possible implementation manner of the fourth aspect, or the fourth possible implementation manner of the fourth aspect, in an eighth possible implementation manner, the device further includes:

a second connection information generation module, configured to: after the fifth sending module sends the public key information of the second device to the first device, generate the connection information, where asymmetric encryption is performed on the connection information by using the public key of the first device; and a second connection information sending module, configured to send the connection information to the first device.

With reference to the eighth possible implementation manner of the fourth aspect, in a ninth possible implementation manner, the device further includes:

a fifth receiving module, configured to: after the fifth sending module sends the public key information of the second device to the first device, and before the second connection information generation module generates the connection information, receive a second verification message sent by the first device, where the second verification message is generated by the first device by performing an asymmetric encryption operation on the public key operation value of the second device and/or the random password information of the second device by using the public key of the second device, or is generated by performing an asymmetric encryption operation by using the public key of the second device, on a signature that is generated by using a private key of the first device; and a second verification and confirmation module, configured to: after successfully verifying the second verification message according to the private key of the second device, trigger the second connection information generation module to generate the connection information; and confirm that the connection information takes effect.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect, or the eighth possible implementation manner of the fourth aspect, or the ninth possible implementation manner of the fourth aspect, in a tenth possible implementation manner, the device further includes:

a sixth receiving module, configured to: after completing a network connection with the first device, receive a public key operation value of a third device that is sent by the first device, where the public key operation value of the third device is a value obtained by performing a preset-algorithm operation on a public key of the third device; and a network connection module, configured to perform a network connection with the third device.

According to a fifth aspect, an embodiment of the present invention provides a network device, including an input apparatus, an output apparatus, a memory, and a processor, where:

the memory is configured to store program code, and the processor is configured to invoke the program code stored in the memory to perform the following steps:

acquiring, by using the input apparatus, a public key operation value of a second device in an out-of-band manner, where the public key operation value of the second device is a value obtained by performing a preset-algorithm operation on a public key of the second device; sending, by using the output apparatus, public key information of a first device to the second device, so that the second device obtains a public key of the first device according to the public key information of the first device; receiving, by using the input apparatus, public key information of the second device that is encrypted by using the public key of the first device and sent by the second device, and decrypting the public key information of the second device by using a private key of the first device, to obtain the public key of the second device; and performing a preset-algorithm operation on the public key of the second device to obtain a copy of the public key operation value of the second device, and after the copy of the public key operation value of the second device matches the public key operation value of the second device, accepting connection information that is sent by the second device and received by the input apparatus, or generating connection information and sending the connection information to the second device by using the output apparatus.

With reference to the fifth aspect, in a first possible implementation manner, when receiving, by using the input apparatus, the public key information of the second device that is encrypted by using the public key of the first device and sent by the second device, the processor further receives, by using the input apparatus, signature verification information sent by the second device, where the signature verification information is information obtained by the second device by performing asymmetric encryption by using a private key of the second device.

With reference to the first possible implementation manner of the fifth aspect, in a second possible implementation manner, after the copy of the public key operation value of the second device matches the public key operation value of the second device, the processor further performs:

verifying the signature verification information by using the public key of the second device; and if the verification succeeds, performing the step of accepting connection information that is sent by the second device and received by the input apparatus, or generating connection information and sending the connection information to the second device by using the output apparatus; or if the verification fails, terminating a connection process.

With reference to the fifth aspect, or the first possible implementation manner of the fifth aspect, or the second possible implementation manner of the fifth aspect, in a third possible implementation manner, the public key information of the first device includes the public key of the first device, or information obtained by performing symmetric encryption on the public key of the first device by using the public key operation value of the second device.

With reference to the fifth aspect, or the first possible implementation manner of the fifth aspect, or the second possible implementation manner of the fifth aspect, in a fourth possible implementation manner, before the sending, by using the output apparatus, public key information of a first device to the second device, the processor further performs: acquiring, by using the input apparatus, random password information of the second device in the out-of-band manner, where the public key information of the first device includes the public key of the first device, or information obtained by performing symmetric encryption on the public key of the first device by using the public key operation value of the second device, or information obtained by performing symmetric encryption on the public key of the first device by using the public key operation value of the second device and the random password information of the second device, or information obtained by performing symmetric encryption on the public key of the first device by using the random password information of the second device.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, in a fifth possible implementation manner, when receiving the public key information of the second device by using the input apparatus, the processor further receives, by using the input apparatus, the connection information generated by the second device, where asymmetric encryption is performed on the connection information by using the public key of the first device; and the accepting connection information that is sent by the second device and received by using the input apparatus includes: decrypting the connection information by using the private key of the first device.

With reference to the fifth aspect, or the first possible implementation manner of the fifth aspect, or the second possible implementation manner of the fifth aspect, or the third possible implementation manner of the fifth aspect, in a sixth possible implementation manner, after the processor receives, by using the input apparatus, the public key information of the second device that is encrypted by using the public key of the first device and sent by the second device, the processor further includes: receiving, by using the input apparatus, the connection information sent by the second device, where asymmetric encryption is performed on the connection information by using the public key of the first device; and that the processor accepts connection information that is sent by the second device and received by using the input apparatus includes: decrypting the connection information by using the private key of the first device.

With reference to the sixth possible implementation manner of the fifth aspect, in a seventh possible implementation manner, after the copy of the public key operation value of the second device matches the public key operation value of the second device, and before the connection information sent by the second device is received by using the input apparatus, the processor further performs:

using the public key of the second device to perform an asymmetric encryption operation on the public key operation value of the second device or on a signature that is generated by using the private key of the first device, to generate a first verification message, and sending the first verification message to the second device by using the output apparatus, so that the second device sends the connection information after successfully verifying the first verification message.

With reference to the fourth possible implementation manner of the fifth aspect, in an eighth possible implementation manner, after the processor receives, by using the input apparatus, the public key information of the second device that is encrypted by using the public key of the first device and sent by the second device, the processor further includes: receiving, by using the input apparatus, the connection information sent by the second device, where asymmetric encryption is performed on the connection information by using the public key of the first device; and that the processor accepts connection information that is sent by the second device and received by using the input apparatus includes: decrypting the connection information by using the private key of the first device.

With reference to the eighth possible implementation manner of the fifth aspect, in a ninth possible implementation manner, after the copy of the public key operation value of the second device matches the public key operation value of the second device, and before the connection information sent by the second device is received by using the input apparatus, the processor further performs:

using the public key of the second device to perform an asymmetric encryption operation on the public key operation value of the second device and/or on the random password information of the second device to generate a second verification message, or using the public key of the second device to perform an asymmetric encryption operation on a signature that is generated by using the private key of the first device, to generate a second verification message, and sending the second verification message to the second device by using the output apparatus, so that the second device sends the connection information after successfully verifying the second verification message.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, or the sixth possible implementation manner of the fifth aspect, or the seventh possible implementation manner of the fifth aspect, or the eighth possible implementation manner of the fifth aspect, or the ninth possible implementation manner of the fifth aspect, in a tenth possible implementation manner, the processor further performs acquiring, by using the input apparatus, a public key operation value of a third device in the out-of-band manner, where the public key operation value of the third device is a value obtained by performing a preset-algorithm operation on a public key of the third device; and after completing a network connection with the second device, sending, by using the output apparatus, the public key operation value of the third device to the second device, so that the second device performs a network connection with the third device.

According to a sixth aspect, an embodiment of the present invention provides a network device, including an input apparatus, an output apparatus, a memory, and a processor, where:

the memory is configured to store program code, and the processor is configured to invoke the program code stored in the memory to perform the following steps:

generating a public key operation value of a second device, for acquisition by a first device in an out-of-band manner, where the public key operation value of the second device is a value obtained by performing a preset-algorithm operation on a public key of the second device; receiving, by using the input apparatus, public key information of the first device that is sent by the first device, acquiring a public key of the first device from the public key information of the first device, and performing asymmetric encryption on the public key of the second device by using the public key of the first device, to generate public key information of the second device; and sending, by using the output apparatus, the public key information of the second device to the first device, so that after the first device obtains the public key of the second device, the first device performs a preset-algorithm operation on the public key of the second device to obtain a copy of the public key operation value of the second device, and that when the copy of the public key operation value of the second device matches the public key operation value of the second device, the first device accepts connection information sent by the second device and received by the input apparatus, or generates connection information and sends the connection information to the second device by using the output apparatus.

With reference to the sixth aspect, in a first possible implementation manner, when sending the public key information of the second device by using the output apparatus, the processor further sends signature verification information generated according to a private key of the second device, so that after the first device detects that the copy of the public key operation value of the second device matches the public key operation value of the second device, the first device verifies the signature verification information by using the public key of the second device.

With reference to the sixth aspect or the first possible implementation manner of the sixth aspect, in a second possible implementation manner, that the processor acquires a public key of the first device from the public key information of the first device includes:

when the public key information of the first device is the public key of the first device, directly acquiring the public key of the first device; and when the public key information of the first device is information obtained by the first device by performing symmetric encryption on the public key of the first device by using the public key operation value of the second device, decrypting the public key information of the first device according to the public key operation value of the second device to acquire the public key of the first device.

With reference to the sixth aspect, or the first possible implementation manner of the sixth aspect, in a third possible implementation manner, before the processor receives, by using the input apparatus, the public key information of the first device that is sent by the first device, the processor further performs: generating random password information of the second device, for acquisition by the first device in the out-of-band manner.

With reference to the third possible implementation manner of the sixth aspect, in a fourth possible implementation manner, that the processor acquires a public key of the first device from the public key information of the first device includes:

when the public key information of the first device is the public key of the first device, directly acquiring the public key of the first device; when the public key information of the first device is information obtained by the first device by performing symmetric encryption on the public key of the first device by using the public key operation value of the second device, decrypting the public key information of the first device according to the public key operation value of the second device to acquire the public key of the first device; when the public key information of the first device is information obtained by the first device by performing symmetric encryption on the public key of the first device by using the random password information of the second device, decrypting the public key information of the first device according to the random password information of the second device to acquire the public key of the first device; and when the public key information of the first device is information obtained by the first device by performing symmetric encryption on the public key of the first device by using the public key operation value of the second device and the random password information of the second device, decrypting the public key information of the first device according to the public key operation value of the second device and the random password information of the second device to acquire the public key of the first device.

With reference to the sixth aspect, or the first possible implementation manner of the sixth aspect, or the second possible implementation manner of the sixth aspect, or the third possible implementation manner of the sixth aspect, or the fourth possible implementation manner of the sixth aspect, in a fifth possible implementation manner, when sending the public key information of the second device to the first device by using the output apparatus, the processor further sends the connection information, where asymmetric encryption is performed on the connection information by using the public key of the first device.

With reference to the sixth aspect, or the first possible implementation manner of the sixth aspect, or the second possible implementation manner of the sixth aspect, in a sixth possible implementation manner, after the processor sends the public key information of the second device to the first device by using the output apparatus, the processor further performs: generating the connection information, where asymmetric encryption is performed on the connection information by using the public key of the first device; and sending the connection information to the first device by using the output apparatus With reference to the sixth possible implementation manner of the sixth aspect, in a seventh possible implementation manner, after the processor sends the public key information of the second device to the first device by using the output apparatus, and before the processor generates the connection information, the processor further performs:

receiving, by using the input apparatus, a first verification message sent by the first device, where the first verification message is generated by the first device by performing an asymmetric encryption operation on the public key operation value of the second device by using the public key of the second device; and after successfully verifying the first verification message according to the private key of the second device, performing the step of generating the connection information; and confirming that the connection information takes effect.

With reference to the third possible implementation manner of the sixth aspect, or the fourth possible implementation manner of the sixth aspect, in an eighth possible implementation manner, after the processor sends the public key information of the second device to the first device by using the output apparatus, the processor further performs:

generating the connection information, where asymmetric encryption is performed on the connection information by using the public key of the first device; and sending the connection information to the first device by using the output apparatus.

With reference to the eighth possible implementation manner of the sixth aspect, in a ninth possible implementation manner, after the processor sends the public key information of the second device to the first device by using the output apparatus, and before the processor generates the connection information, the processor further performs:

receiving, by using the input apparatus, a second verification message sent by the first device, where the second verification message is generated by the first device by performing an asymmetric encryption operation on the public key operation value of the second device and/or the random password information of the second device by using the public key of the second device, or is generated by performing an asymmetric encryption operation by using the public key of the second device, on a signature that is generated by using a private key of the first device; and after successfully verifying the second verification message according to the private key of the second device, performing the step of generating the connection information; and confirming that the connection information takes effect.

With reference to the sixth aspect, or the first possible implementation manner of the sixth aspect, or the second possible implementation manner of the sixth aspect, or the third possible implementation manner of the sixth aspect, or the fourth possible implementation manner of the sixth aspect, or the fifth possible implementation manner of the sixth aspect, or the sixth possible implementation manner of the sixth aspect, or the seventh possible implementation manner of the sixth aspect, or the eighth possible implementation manner of the sixth aspect, or the ninth possible implementation manner of the sixth aspect, in a tenth possible implementation manner, after completing a network connection with the first device, the processor receives, by using the input apparatus, a public key operation value of a third device that is sent by the first device, where the public key operation value of the third device is a value obtained by performing a preset-algorithm operation on a public key of the third device; and performs a network connection with the third device.

According to a seventh aspect, an embodiment of the present invention provides a network connection system, including a first device and a second device, where:

the first device is the network device in the fifth aspect, or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, or the sixth possible implementation manner of the fifth aspect, or the seventh possible implementation manner of the fifth aspect, or the eighth possible implementation manner of the fifth aspect, or the ninth possible implementation manner of the fifth aspect, or the tenth possible implementation manner of the fifth aspect; and the second device is the network device in the sixth aspect, or the first possible implementation manner of the sixth aspect, or the second possible implementation manner of the sixth aspect, or the third possible implementation manner of the sixth aspect, or the fourth possible implementation manner of the sixth aspect, or the fifth possible implementation manner of the sixth aspect, or the sixth possible implementation manner of the sixth aspect, or the seventh possible implementation manner of the sixth aspect, or the eighth possible implementation manner of the sixth aspect, or the ninth possible implementation manner of the sixth aspect, or the tenth possible implementation manner of the sixth aspect.

By implementing the embodiments of the present invention, an operation is performed on a public key to obtain a public key operation value, and the public key operation value is used to replace a complete public key in information exchanged in a connection process, which can reduce content of exchanged information, improve utilization of an out-of-band channel connecting two devices, and improve security of the connection process; when a network connection is performed by scanning a multi-dimensional code, encoded content of the multi-dimensional code can be reduced greatly, requirements on displaying, scanning, and decoding of the multi-dimensional code are reduced, applicability is high, and connection efficiency is improved greatly, which greatly improve connection experience of a user; in addition, a connection can be performed by using the public key operation value with reference to random password information, which improves security of the connection process greatly.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
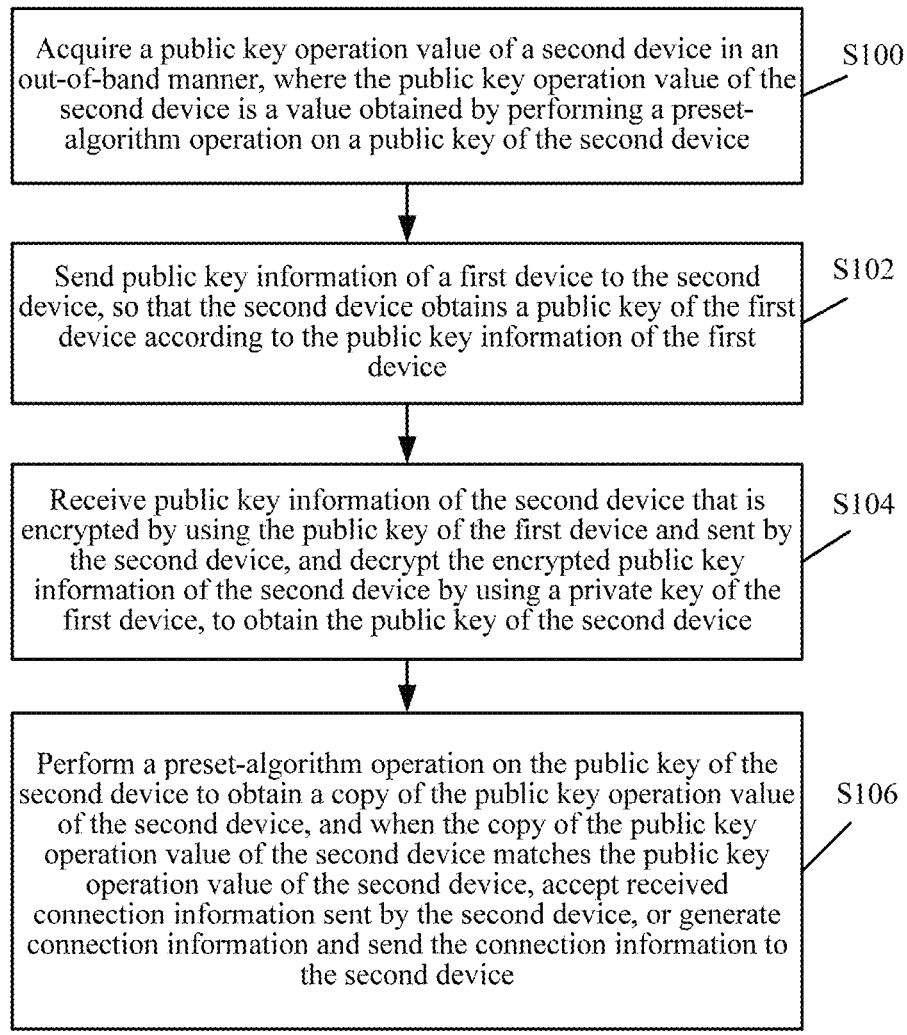
FIG. 1 is a schematic flowchart of a first embodiment of a secure connection method for a network device according to the present invention.

Referring to FIG. 1, FIG. 1 is a schematic flowchart of a first embodiment of a secure connection method for a network device according to the present invention. The method includes:

Step S100: Acquire a public key operation value of a second device in an out-of-band manner, where the public key operation value of the second device is a value obtained by performing a preset-algorithm operation on a public key of the second device.

Specifically, it is assumed that a local device is a first device and needs to perform a network connection with the second device. The second device has its own public-private key pair, and the second device may obtain the public key operation value of the second device after performing the preset-algorithm operation on the public key of the second device. The preset algorithm includes but is not limited to a hash algorithm, where the hash algorithm may be a secure hash algorithm-256 (SHA-256), an SHA-224, a message digest algorithm 5 (MD5), or the like, which is not limited. Therefore, the public key operation value in this embodiment of the present invention includes but is not limited to: partial truncation information of the public key, a hash value of the public key (a value obtained after the hash operation), and derivative information (dynamic or static) of the public key such as a hash value obtained after an operation is performed on the public key with reference to other data, where a length of the derivative information of the public key may be not less than 128 bits.

More specifically, the first device may acquire the public key operation value of the second device in multiple out-of-band manners, including but not limited to the following three acquisition manners:

a. The second device encodes the obtained public key operation value into a multi-dimensional code, and the first device obtains the multi-dimensional code by scanning or the like, and obtains the public key operation value of the second device by decoding. According to different device capabilities, a multi-dimensional code may be a static multi-dimensional code, such as a multi-dimensional code printed on a label, and is attached to a device when the device is manufactured or delivered from a factory; or may be a dynamic multi-dimensional code, for example, the multi-dimensional code is generated dynamically by the second device and displayed on a screen; a multi-dimensional code style may be any identifiable and readable one-dimensional barcode and two-dimensional barcode styles, such as a universal product code (UPC) and a quick response code (QR Code). The present invention is not limited thereto. The first device has functions of acquiring and identifying the multi-dimensional code to obtain the multi-dimensional code and decode the multi-dimensional code to obtain the public key operation value of the second device.

b. The first device obtains the public key operation value of the second device in a near field communications mode. For example, the first device obtains the public key operation value of the second device through an NFC interface, and specifically may obtain the public key operation value of the second device in an NFC active mode or an NFC passive mode. Alternatively, the second device sends, in a packet, the public key operation value of the second device to the first device in other wireless low-power communications modes such as low-power Bluetooth or low-power Wi-Fi.

c. The first device obtains the public key operation value of the second device by receiving an input of a human-machine interaction interface, for example, receiving the public key operation value of the second device input by a user by using a keyboard, or receiving the public key operation value of the second device input from a USB interface.

It may be understood that the first device may acquire the public key operation value of the second device from another device, that is, if a third device stores the public key operation value of the second device, the first device may acquire the public key operation value of the second device from the third device in the out-of-band manner; for example, if the third device includes a multi-dimensional code image of the second device, the first device may acquire the public key operation value of the second device by scanning the multi-dimensional code image displayed on a display screen of the third device. In addition, when acquiring the public key operation value of the second device in the out-of-band manner, the first device may further acquire the following information, that is, for example, when the first device acquires the public key operation value of the second device by scanning a two-dimensional code, the two-dimensional code may further include but is not limited to the following information:

an address identifier MAC address of the second device, a type of the device (an AP, a sensor, an ordinary device, or the like), a role of the device (a registrar, an enrollee, a group owner, a client, or the like), and other device information, even including information such as a channel number used to accelerate a process of mutual discovery of devices and a random value used for freshness of a message or used to generate a type of information. The first device and the second device may determine, according to the type information of the device and the role information of the device, whether to generate a credential and send the credential to a peer device, or wait for receiving a credential sent by a peer device.

Step S102: Send public key information of a first device to the second device, so that the second device obtains a public key of the first device according to the public key information of the first device.

Specifically, the public key of the first device may be dynamically generated or invariably fixed. The first device may generate the public key information of the first device according to the public key of the first device, and send the public key information of the first device to the second device through a Wi-Fi channel, so that the second device obtains the public key of the first device according to the public key information of the first device.

Step S104: Receive public key information of the second device that is encrypted by using the public key of the first device and sent by the second device, and decrypt the encrypted public key information of the second device by using a private key of the first device, to obtain the public key of the second device.

Specifically, after obtaining the public key of the first device, the second device may use the public key of the first device to perform asymmetric encryption on the public key of the second device to generate the public key information of the second device, and send the public key information of the second device to the first device.

Step S106: Perform a preset-algorithm operation on the public key of the second device to obtain a copy of the public key operation value of the second device, and when the copy of the public key operation value of the second device matches the public key operation value of the second device, accept received connection information sent by the second device, or generate connection information and send the connection information to the second device.

Specifically, the algorithm used by the first device to perform the operation on the public key of the second device is not further described herein, and for details, reference may be made to the algorithm in step S100. The first device matches and compares the copy of the public key operation value of the second device after the operation with the public key operation value of the second device that is obtained in step S100, and if the two are equal, it indicates that the match is determined to be successful, and it is confirmed that a received message is a message sent by the second device. Therefore, subsequently, the first device may accept the received connection information sent by the second device, that is, use the received connection information to establish a connection with the second device, or generate the connection information and send the connection information to the second device.

Further, in step S104, when the public key information of the second device that is encrypted by using the public key of the first device and sent by the second device is received, signature verification information sent by the second device may be further received, where the signature verification information is information obtained by the second device by performing asymmetric encryption by using a private key of the second device. After the copy of the public key operation value of the second device matches the public key operation value of the second device in step S106, the method may further include: verifying the signature verification information by using the public key of the second device; and if the verification succeeds, performing the step of accepting received connection information sent by the second device, or generating connection information and sending the connection information to the second device; or if the verification fails, terminating a connection process.

Specifically, the signature verification information in this embodiment of the present invention may be information obtained by the second device by using the private key of the second device to perform asymmetric encryption on any information agreed upon by the two devices, for example, may be information obtained by the second device by performing asymmetric encryption on the public key information of the second device by using the private key of the second device; the information agreed upon by the two devices may further be content of a sent message, or digest information, or the like; the first device verifies the signature verification information by using the public key of the second device obtained in step S104, and verifies whether a signature is correct. If the verification succeeds, it indicates that the message is a message sent by the second device; and subsequently, the first device may accept the received connection information sent by the second device, or generate the connection information and send the connection information to the second device. If the verification fails, it indicates that the message is not a message sent by the second device, and the first device does not accept the message, that is, discards the message.

Still further, the public key information of the first device that is sent in step S102 may be the public key of the first device directly, or may be information obtained by performing symmetric encryption on the public key of the first device by using the public key operation value of the second device. Specifically, when the public key information of the first device is the public key of the first device directly, when receiving the public key information of the first device, the second device directly obtains the public key of the first device; when the public key information of the first device is the information obtained by performing symmetric encryption on the public key of the first device by using the public key operation value of the second device, after receiving the public key information of the first device, the second device needs to use the public key operation value of the second device to decrypt the public key information of the first device to obtain the public key of the first device.

Still further, in this embodiment of the present invention, after the copy of the public key operation value of the second device matches the public key operation value of the second device, and before the received connection information sent by the second device is accepted in step S106, the method further includes: using the public key of the second device to perform an asymmetric encryption operation on the public key operation value of the second device or on a signature that is generated by using the private key of the first device, to generate a first verification message, and sending the first verification message to the second device, to prove, to the second device, that the first device has correct public key information of the second device, so that the second device validates the generated or received connection information after successfully verifying the first verification message, and finally completes the network connection.

It should be noted that, optionally, in step S104 in this embodiment of the present invention, when the public key information of the second device is received, the connection information generated by the second device may be further received, where asymmetric encryption is performed on the connection information by using the public key of the first device, that is, the second device may send the connection information when sending the public key information of the second device; after the first device receives the connection information, after the copy of the public key operation value of the second device matches the public key operation value of the second device, and the signature verification succeeds, the first device accepts the connection information, and finally completes the network connection.

It should also be noted that in this embodiment of the present invention, optionally, after the copy of the public key operation value of the second device matches the public key operation value of the second device in step S106, the first device generates the connection information and sends the connection information to the second device, where asymmetric encryption is performed on the connection information by using the public key of the second device, so that after acquiring the connection information, the second device performs decryption by using the private key of the second device, and that finally the two devices acquire the connection information and complete the network connection.

It should also be noted that in this embodiment of the present invention, optionally, after the first verification message is sent to the second device in step S106, the connection information sent by the second device is received; the connection information is connection information generated after the second device successfully verifies the first verification message, where asymmetric encryption is also performed on the connection information by using the public key of the first device; the first device decrypts the connection information by using the private key of the first device, and finally completes the network connection. In this embodiment of the present invention, the first verification message may not need to be sent to the second device, and the connection information sent by the second device is directly received after the public key information of the second device that is encrypted by using the public key of the first device and sent by the second device is received in step S104.

Still further, before the public key information of the first device is sent to the second device in step S102, the method may further include: acquiring random password information of the second device in the out-of-band manner. Preferably, when acquiring the public key operation value of the second device in the out-of-band manner in step S100, the first device also acquires the random password information of the second device; specifically, the second device generates the random password information of the second device, for acquisition by the first device in the out-of-band manner; then, the public key information of the first device that is sent to the second device in step S102 may include the following cases:

The public key information of the first device is the public key of the first device directly, or the public key information of the first device is information obtained by performing symmetric encryption on the public key of the first device by using the public key operation value of the second device, or the public key information of the first device is information obtained by performing symmetric encryption on the public key of the first device by using the public key operation value of the second device and the random password information of the second device, or the public key information of the first device is information obtained by performing symmetric encryption on the public key of the first device by using the random password information of the second device.

It is understandable that, after receiving the public key information of the first device, the second device decrypts the public key information of the first device according to a decryption key corresponding to the foregoing cases to obtain the public key of the first device.

Still further, in this embodiment of the present invention, after the copy of the public key operation value of the second device matches the public key operation value of the second device, and before the received connection information sent by the second device is accepted in step S106, the method further includes: using the public key of the second device to perform an asymmetric encryption operation on the public key operation value of the second device and/or on the random password information of the second device to generate a second verification message, or using the public key of the second device to perform an asymmetric encryption operation on a signature that is generated by using the private key of the first device, to generate a second verification message, and sending the second verification message to the second device, to prove, to the second device, that the first device has correct public key information of the second device, so that the second device validates the generated or received connection information after successfully verifying the second verification message, and finally completes the network connection.

Likewise, after obtaining the random password information of the second device, when receiving the public key information of the second device in step S104, the first device may further receive the connection information generated by the second device, where asymmetric encryption is performed on the connection information by using the public key of the first device, that is, the second device may send the connection information when sending the public key information of the second device; after the first device receives the connection information, after the copy of the public key operation value of the second device matches the public key operation value of the second device, and the signature verification succeeds, the first device accepts the connection information, and finally completes the network connection; or after the copy of the public key operation value of the second device matches the public key operation value of the second device in step S106, the first device generates the connection information and sends the connection information to the second device, where asymmetric encryption is performed on the connection information by using the public key of the second device, so that after acquiring the connection information, the second device performs decryption by using the private key of the second device, and that finally the two devices acquire the connection information and complete the network connection; or after the second verification message is sent to the second device in step S106, the connection information sent by the second device is received; the connection information is connection information generated after the second device successfully verifies the second verification message, where asymmetric encryption is also performed on the connection information by using the public key of the first device; the first device decrypts the connection information by using the private key of the first device, and finally completes the network connection.

It is understandable that in this embodiment of the present invention, the first device may not need to send the second verification message to the second device; instead, after receiving the public key information of the second device that is encrypted by using the public key of the first device and sent by the second device in step S104, the first device directly receives the connection information sent by the second device.

Still it is understandable that in this embodiment of the present invention the first device may further send a random value n to the second device beforehand, then:

when generating the first verification message, the first device may specifically use the public key of the second device to perform an asymmetric operation on a hash operation value between the public key operation value of the second device and the random value n, to generate the first verification message; then after receiving the first verification message, the second device uses its own private key to perform decryption to obtain the hash operation value between the public key operation value of the second device and the random value n, then performs a hash operation on the pre-obtained random value n sent by the first device and the public key operation value of the second device stored in the second device, and determines whether a value obtained after the operation is equal to the hash operation value obtained through decryption; and if they are equal, the verification succeeds; otherwise, the verification fails. Likewise, when generating the second verification message, the first device may specifically use the public key of the second device to perform an asymmetric operation on a hash operation value between the public key operation value of the second device and/or the random password information of the second device and the random value n, to generate the second verification message; then after receiving the second verification message, the second device uses its own private key to perform decryption to obtain the hash operation value between the public key operation value of the second device and/or the random password information of the second device and the random value n, then performs a hash operation on the pre-obtained random value n sent by the first device and the public key operation value of the second device and/or the random password information of the second device stored in the second device, and determines whether a value obtained after the operation is equal to the hash operation value obtained through decryption; and if they are equal, the verification succeeds; otherwise, the verification fails.

Still it is understandable that in this embodiment of the present invention, the first device may further send the hash operation value between the public key operation value of the second device and the random value n beforehand, and then when generating the first verification message, the first device uses the public key of the second device as an asymmetric encryption key to encrypt the random value n. Then after receiving the first verification message, the second device uses its own private key to obtain the random value n through decryption, and then performs a hash operation on the random value n and the public key operation value of the second device stored in the second device, and determines whether a value obtained after the operation is equal to the hash operation value obtained through decryption; and if they are equal, the verification succeeds; otherwise, the verification fails.

Likewise, when generating the second verification message, the first device may specifically use the public key of the second device as an asymmetric encryption key to perform an asymmetric operation on a hash operation value between the public key operation value of the second device and/or the random password information of the second device and the random value n, to generate the second verification message. Then after receiving the second verification message, the second device uses its own private key to obtain the random value n through decryption, and then performs a hash operation on the random value n and the public key operation value of the second device and/or the random password information of the second device stored in the second device, and determines whether a value obtained after the operation is equal to the hash operation value obtained through decryption; and if they are equal, the verification succeeds; otherwise, the verification fails.

It should be noted that the first device and the second device in this embodiment of the present invention may use a discovery process, and specifically may use a discovery mechanism in 802.11:

(1) Active discovery process: After obtaining information of the second device in the out-of-band manner, the first device sends a probe message probe request to the second device, where the probe request carries WiFi simple configuration information elements (WSC IE); the second device returns a probe response message probe response after receiving the message, where the probe response carries a WSC IE. The Probe request may carry a connection manner to be used by the device, and the probe response returns the configured connection manner.

(2) Passive discovery process: If one device is an AP, a broadcast message (beacon message) of the AP may carry a WSC IE to be used for the discovery process.

Figure 2:
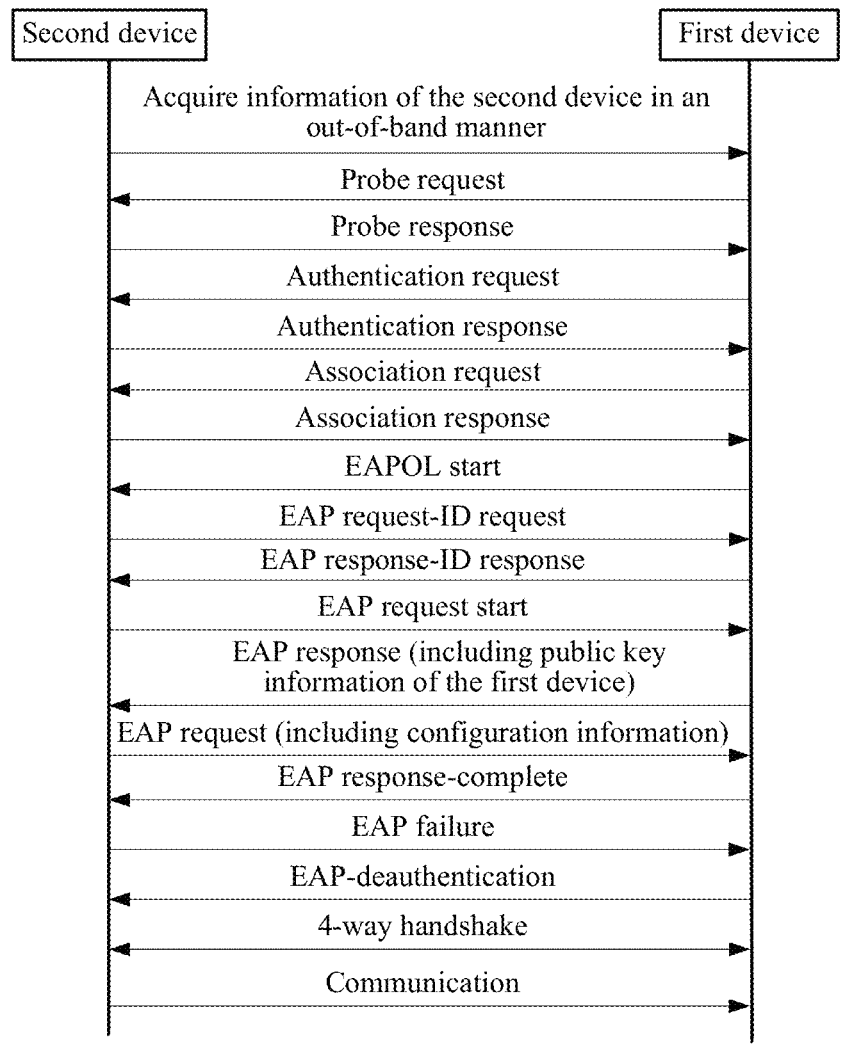
FIG. 2 is a schematic flowchart of a second embodiment of a secure connection method for a network device according to the present invention.

More specifically, for the connection process in this embodiment of the present invention, the connection process may be completed by encapsulating an Extensible Authentication Protocol (EAP) request message and an EAP response message, and the two devices obtain a credential. In a 4-way handshake that is performed subsequently, a connection is performed on a basis of a connection password in the credential generated in the connection process, and a PMK (pairwise master key), pairwise master key is generated on the basis of the connection password. In the 4-way handshake process, the PTK (pairwise transient key) pairwise transient key is generated on a basis of the PMK, and finally the PTK is used to encrypt communication content. For details, reference is made to the schematic diagram of a complete connection process in an embodiment of the present invention in FIG. 2.

It is understandable that when the first device in this embodiment of the present invention does not send the first verification message or the second verification message to the second device, information verification of the two devices may be completed in the 4-way handshake process.

Still further, in some network connection scenarios, when two devices (assuming a device A and a device B) are both UI-restricted devices, one device cannot obtain a public key operation value of the other device securely; in this case, a third-party device is required to assist in configuring and connecting the two devices to be configured and connected; specifically, the third-party device may acquire public key operation values of the two UI-restricted devices in the out-of-band manner; it may be assumed that the third-party device is the first device in the embodiment in FIG. 1, and the device A is the second device; then the third-party device may perform a network connection with the device A according to the embodiment in FIG. 1, and send a public key operation value of the device B after the third-party device sends connection information to the device A, so that the device A receives the public key operation value of the device B securely; then the device A and the device B perform a network connection; or the third-party device may perform a network connection with the device A according to the embodiment in FIG. 1, and replace connection information that the third-party device prepares to send to the device A with a public key operation value of the device B, so that the device A receives the public key operation value of the device B securely; then the device A and the device B perform a network connection.

It should be noted that the implementation manner in the embodiment in FIG. 1 may also be used for performing the network connection between the device A and the device B.

Figure 3:
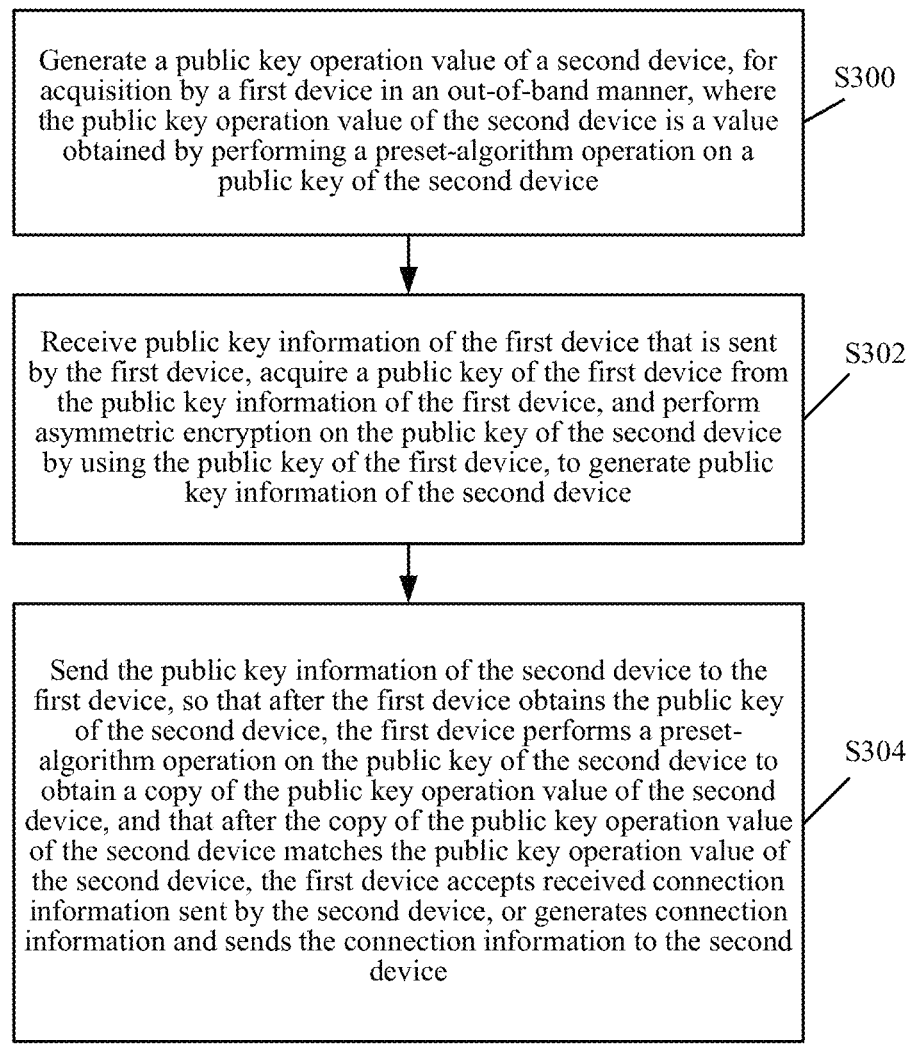
FIG. 3 is a schematic flowchart of a third embodiment of a secure connection method for a network device according to the present invention.

To better implement the foregoing solution in this embodiment of the present invention, the following describes the connection process by using the second device with reference to FIG. 3, which shows a schematic flowchart of a second embodiment of a secure connection method for a network device according to the present invention, where the method includes:

Step S300: Generate a public key operation value of a second device, for acquisition by a first device in an out-of-band manner, where the public key operation value of the second device is a value obtained by performing a preset-algorithm operation on a public key of the second device.

Specifically, the second device has its own public-private key pair. The operation algorithm that the second device performs on its own public key is not further described herein, and for details, reference may be made to the operation algorithm described in step S100 in the embodiment in FIG. 1. How the first device performs acquisition in the out-of-band manner is not further described herein, and for details, reference may be made to the operation algorithm described in step S100 in the embodiment in FIG. 1.

Step S302: Receive public key information of the first device that is sent by the first device, acquire a public key of the first device from the public key information of the first device, and perform asymmetric encryption on the public key of the second device by using the public key of the first device, to generate public key information of the second device.

Specifically, the public key information of the first device that is sent by the first device is received through a Wi-Fi channel.

Step S304: Send the public key information of the second device to the first device, so that after the first device obtains the public key of the second device, the first device performs a preset-algorithm operation on the public key of the second device to obtain a copy of the public key operation value of the second device, and that after the copy of the public key operation value of the second device matches the public key operation value of the second device, the first device accepts received connection information sent by the second device, or generates connection information and sends the connection information to the second device.

Further, when the public key information of the second device is sent in step S304, signature verification information generated according to a private key of the second device may be further sent, so that after the first device detects that the copy of the public key operation value of the second device matches the public key operation value of the second device, the first device verifies the signature verification information by using the public key of the second device.

Still further, when the public key information of the first device in step S302 is the public key of the first device, the public key of the first device is directly acquired; and when the public key information of the first device is information obtained by the first device by performing symmetric encryption on the public key of the first device by using the public key operation value of the second device, the public key information of the first device is decrypted according to the public key operation value of the second device to acquire the public key of the first device.

Still further, after the public key information of the second device is sent to the first device in step S304, the method may further include: receiving a first verification message sent by the first device, where the first verification message is generated by the first device by performing an asymmetric encryption operation on the public key operation value of the second device by using the public key of the second device; and after successfully verifying the first verification message according to the private key of the second device, confirming that the connection information takes effect and finally completing a network connection.

It should be noted that, when the public key information of the second device is sent to the first device in step S304, the connection information may be further sent, where asymmetric encryption is performed on the connection information by using the public key of the first device.

It should also be noted that, after the public key information of the second device is sent to the first device in step S304, the method may further include: when receiving the first verification message sent by the first device, receiving the connection information generated by the first device, where asymmetric encryption is performed on the connection information by using the public key of the second device; after acquiring the connection information, the second device performs decryption by using the private key of the second device. Finally the two devices acquire the connection information, and complete the network connection after successfully verifying the first verification message.

It should also be noted that, the second device may further generate the connection information after successfully verifying the first verification message according to the private key of the second device, where asymmetric encryption is performed on the connection information by using the public key of the first device, and send the connection information to the first device. The first device decrypts the connection information by using a private key of the first device, and finally completes the network connection; or the second device does not need to receive the first verification message, but directly generates the connection information and sends the connection information to the first device.

Still further, before the public key information of the first device that is sent by the first device is received in step S302, the method may further include: generating random password information of the second device, for acquisition by the first device in the out-of-band manner. Preferably, the random password information of the second device is provided when the public key operation value of the second device is provided to the first device in step S300; then the acquiring a public key of the first device from the public key information of the first device in step S302 may include the following cases:

when the public key information of the first device is the public key of the first device, directly acquiring the public key of the first device; when the public key information of the first device is information obtained by the first device by performing symmetric encryption on the public key of the first device by using the public key operation value of the second device, decrypting the public key information of the first device according to the public key operation value of the second device to acquire the public key of the first device; when the public key information of the first device is information obtained by the first device by performing symmetric encryption on the public key of the first device by using the random password information of the second device, decrypting the public key information of the first device according to the random password information of the second device to acquire the public key of the first device; and when the public key information of the first device is information obtained by the first device by performing symmetric encryption on the public key of the first device by using the public key operation value of the second device and the random password information of the second device, decrypting the public key information of the first device according to the public key operation value of the second device and the random password information of the second device to acquire the public key of the first device.

Still further, after the public key information of the second device is sent to the first device in step S304, the method may further include: receiving a second verification message sent by the first device, where the second verification message is generated by the first device by performing an asymmetric encryption operation on the public key operation value of the second device and/or the random password information of the second device by using the public key of the second device; and after successfully verifying the second verification message according to the private key of the second device, confirming that the connection information takes effect.

Specifically, the first device performs an asymmetric encryption operation on the public key operation value of the second device and/or the random password information of the second device by using the public key of the second device, to generate the second verification message, and sends the second verification message to the second device, to prove, to the second device, that the first device has correct public key information of the second device; the second device validates the generated or received connection information after successfully verifying the second verification message, and finally completes the network connection.

Likewise, after the second device generates the random password information of the second device, for acquisition by the first device in the out-of-band manner, when the public key information of the second device is sent to the first device in step S304, the connection information may be further sent, where asymmetric encryption is performed on the connection information by using the public key of the first device; or after the public key information of the second device is sent to the first device in step S304, the method may further include: when receiving the second verification message sent by the first device, receiving the connection information generated by the first device, where asymmetric encryption is performed on the connection information by using the public key of the second device; after acquiring the connection information, the second device performs decryption by using the private key of the second device; finally the two devices acquire the connection information, and complete the network connection after successfully verifying the second verification message; or the second device may further generate the connection information after successfully verifying the second verification message according to the private key of the second device, where asymmetric encryption is performed on the connection information by using the public key of the first device, and send the connection information to the first device; the first device decrypts the connection information by using the private key of the first device and finally completes the network connection; or the second device does not need to receive the second verification message, but directly generates the connection information and sends the connection information to the first device.

Still further, in some network connection scenarios, when two devices (assuming a device A and a device B) are both UI-restricted devices, one device cannot obtain a public key operation value of the other device securely; in this case, a third-party device is required to assist in configuring and connecting the two devices to be configured and connected; specifically, the third-party device may acquire public key operation values of the two UI-restricted devices in the out-of-band manner; it may be assumed that the third-party device is the first device in the embodiment in FIG. 3, and the device A is the second device; then the third-party device may perform a network connection with the device A according to the embodiment in FIG. 3, and send a public key operation value of the device B after the third-party device sends connection information to the device A, so that the device A receives the public key operation value of the device B securely; then the device A and the device B perform a network connection; or the third-party device may perform a network connection with the device A according to the embodiment in FIG. 3, and replace connection information that the third-party device prepares to send to the device A with a public key operation value of the device B, so that the device A receives the public key operation value of the device B securely; then the device A and the device B perform a network connection.

It should be noted that the implementation manner in the embodiment in FIG. 3 may also be used for performing the network connection between the device A and the device B.

It should be noted that, the connection information in embodiments of the present invention is used for establishing a secure connection, or the connection information is used for performing a network configuration between devices to acquire new connection information, or the connection information is used for performing an existing WPS configuration. That the first device accepts the connection information or that the second device confirms that the connection information takes effect, which is described in the embodiments of the present invention, means that the second device successfully verifies the connection information, and that the second device may use the connection information to access a wireless network.

By implementing the embodiments of the present invention, an operation is performed on a public key to obtain a public key operation value, and the public key operation value is used to replace a complete public key in information exchanged in a connection process, which can reduce content of exchanged information, improve utilization of an out-of-band channel connecting two devices, and improve security of the connection process; when a network connection is performed by scanning a multi-dimensional code, encoded content of the multi-dimensional code can be reduced greatly, requirements on displaying, scanning, and decoding of the multi-dimensional code are reduced, applicability is high, and connection efficiency is improved greatly, which greatly improve connection experience of a user; in addition, a connection can be performed by using the public key operation value with reference to random password information, which improves security of the connection process greatly.

The following describes in detail a secure connection method for a network device according to an embodiment of the present invention with reference to FIG. 1 to FIG. 11.

Figure 4:
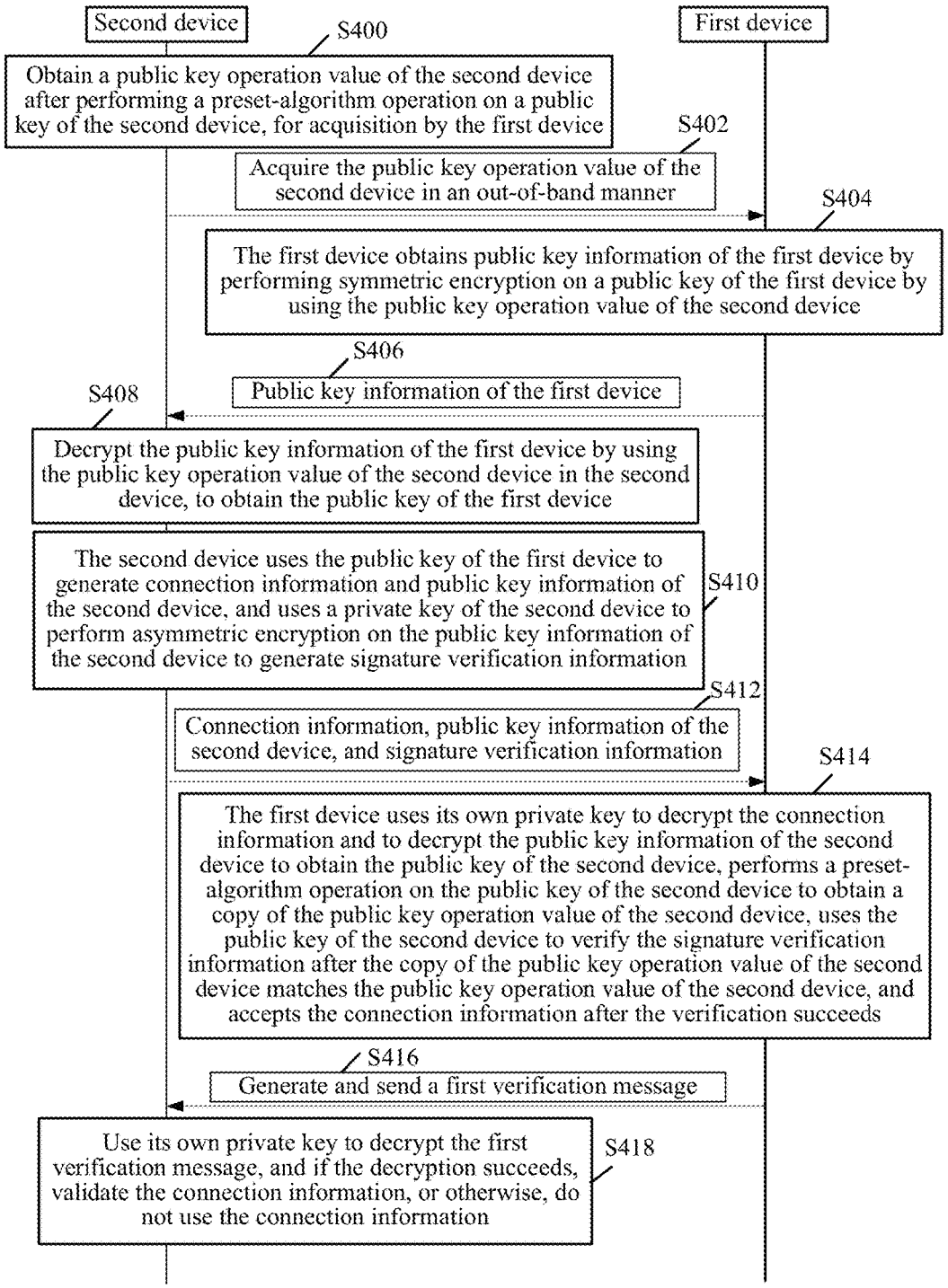
FIG. 4 is a schematic flowchart of a fourth embodiment of a secure connection method for a network device according to the present invention.

FIG. 4 shows a schematic flowchart of a third embodiment of a secure connection method for a network device according to the present invention, where the method includes:

Step S400: A second device obtains a public key operation value of the second device after performing a preset-algorithm operation on a public key of the second device, for acquisition by a first device.

Step S402: The first device acquires the public key operation value of the second device in an out-of-band manner.

Step S404: The first device obtains public key information of the first device by performing symmetric encryption on a public key of the first device by using the public key operation value of the second device.

Step S406: The first device sends the public key information of the first device to the second device.

Step S408: The second device decrypts the public key information of the first device by using the public key operation value of the second device in the second device, to obtain the public key of the first device.

Step S410: The second device uses the public key of the first device to generate connection information and public key information of the second device, and uses a private key of the second device to perform asymmetric encryption on the public key information of the second device to generate signature verification information.

Step S412: The second device sends the connection information, the public key information of the second device, and the signature verification information to the first device.

Step S414: The first device uses its own private key to decrypt the connection information and to decrypt the public key information of the second device to obtain the public key of the second device, performs a preset-algorithm operation on the public key of the second device to obtain a copy of the public key operation value of the second device, uses the public key of the second device to verify the signature verification information after the copy of the public key operation value of the second device matches the public key operation value of the second device, and accepts the connection information after the verification succeeds.

Step S416: The first device uses the public key of the second device to perform an asymmetric encryption operation on the public key operation value of the second device, to generate a first verification message, and sends the first verification message to the second device.

Step S418: The second device uses its own private key to decrypt the first verification message, and if the decryption succeeds, validates the connection information, or otherwise, does not use the connection information.

It should be noted that, the second device may not send the connection information to the first device in step S412, and may send the connection information only after the decryption performed by the second device succeeds in step S418.

Figure 5:
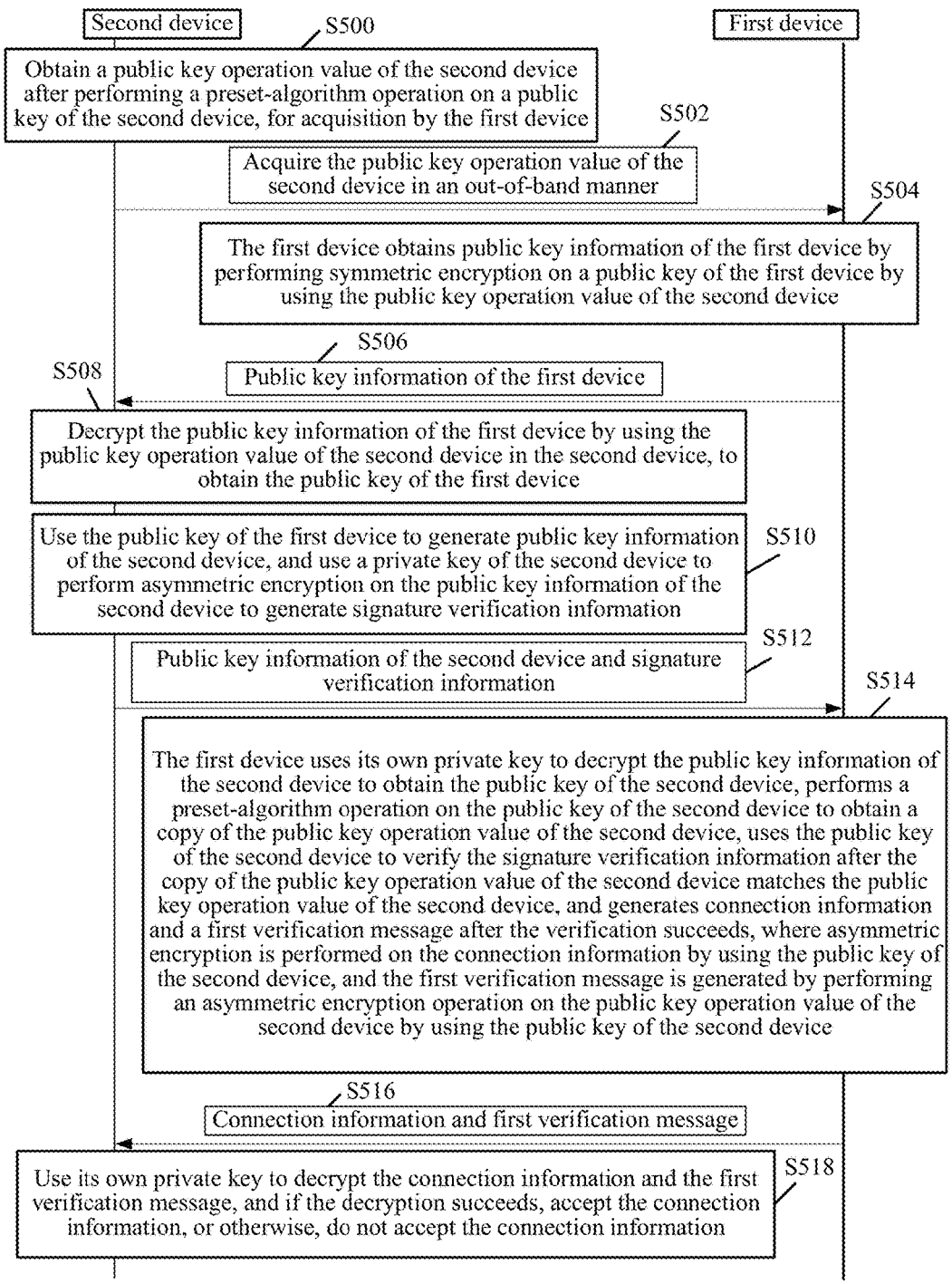
FIG. 5 is a schematic flowchart of a fifth embodiment of a secure connection method for a network device according to the present invention.

FIG. 5 shows a schematic flowchart of a fourth embodiment of a secure connection method for a network device according to the present invention, including:

Step S500: A second device obtains a public key operation value of the second device after performing a preset-algorithm operation on a public key of the second device, for acquisition by a first device.

Step S502: The first device acquires the public key operation value of the second device in an out-of-band manner.

Step S504: The first device obtains public key information of the first device by performing symmetric encryption on a public key of the first device by using the public key operation value of the second device.

Step S506: The first device sends the public key information of the first device to the second device.

Step S508: The second device decrypts the public key information of the first device by using the public key operation value of the second device in the second device, to obtain the public key of the first device.

Step S510: The second device uses the public key of the first device to generate public key information of the second device, and uses a private key of the second device to perform asymmetric encryption on the public key information of the second device to generate signature verification information.

Step S512: The second device sends the public key information of the second device and the signature verification information to the first device.

Step S514: The first device uses its own private key to decrypt the public key information of the second device to obtain the public key of the second device, performs a preset-algorithm operation on the public key of the second device to obtain a copy of the public key operation value of the second device, uses the public key of the second device to verify the signature verification information after the copy of the public key operation value of the second device matches the public key operation value of the second device, and generates connection information and a first verification message after the verification succeeds, where asymmetric encryption is performed on the connection information by using the public key of the second device, and the first verification message is generated by performing an asymmetric encryption operation on the public key operation value of the second device by using the public key of the second device.

Step S516: The first device sends the connection information and the first verification message to the second device.

Step S518: The second device uses its own private key to decrypt the connection information and the first verification message, and if the decryption succeeds, accepts the connection information, or otherwise, does not accept the connection information.

Figure 6:
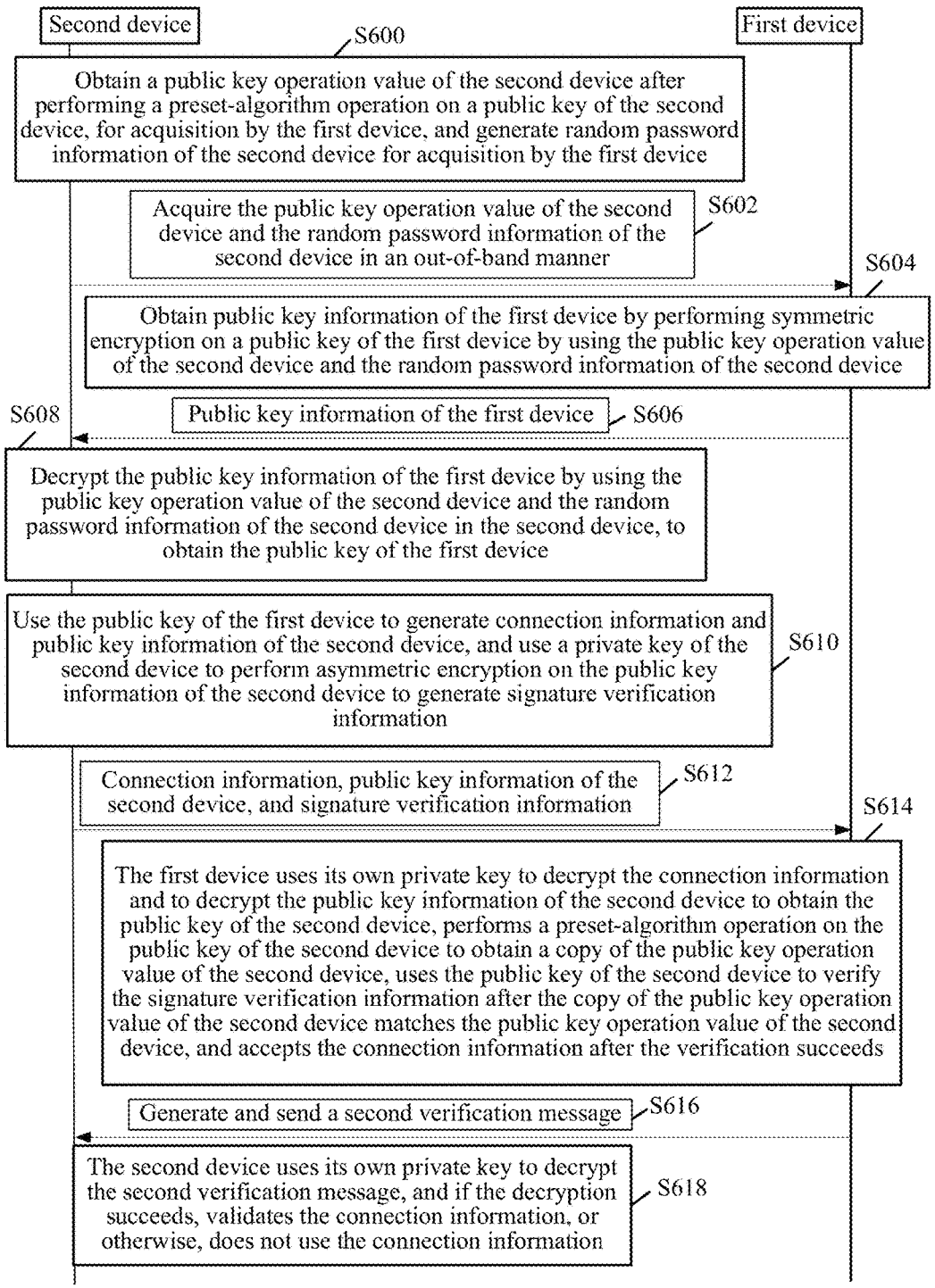
FIG. 6 is a schematic flowchart of a sixth embodiment of a secure connection method for a network device according to the present invention.

FIG. 6 shows a schematic flowchart of a fifth embodiment of a secure connection method for a network device according to the present invention, including:

Step S600: A second device obtains a public key operation value of the second device after performing a preset-algorithm operation on a public key of the second device, for acquisition by a first device, and generates random password information of the second device for acquisition by the first device.

Step S602: The first device acquires the public key operation value of the second device and the random password information of the second device in an out-of-band manner.

Step S604: The first device obtains public key information of the first device by performing symmetric encryption on a public key of the first device by using the public key operation value of the second device and the random password information of the second device.

Step S606: The first device sends the public key information of the first device to the second device.

Step S608: The second device decrypts the public key information of the first device by using the public key operation value of the second device and the random password information of the second device in the second device, to obtain the public key of the first device.

Step S610: The second device uses the public key of the first device to generate connection information and public key information of the second device, and uses a private key of the second device to perform asymmetric encryption on the public key information of the second device to generate signature verification information.

Step S612: The second device sends the connection information, the public key information of the second device, and the signature verification information to the first device.

Step S614: The first device uses its own private key to decrypt the connection information and to decrypt the public key information of the second device to obtain the public key of the second device, performs a preset-algorithm operation on the public key of the second device to obtain a copy of the public key operation value of the second device, uses the public key of the second device to verify the signature verification information after the copy of the public key operation value of the second device matches the public key operation value of the second device, and accepts the connection information after the verification succeeds.

Step S616: The first device uses the public key of the second device to perform an asymmetric encryption operation on the public key operation value of the second device and/or the random password information of the second device to generate a second verification message, and sends the second verification message to the second device.

Step S618: The second device uses its own private key to decrypt the second verification message, and if the decryption succeeds, validates the connection information, or otherwise, does not use the connection information.

Specifically, if the public key operation value of the second device and/or the random password information of the second device that is obtained by decrypting the second verification message is the same as the public key operation value of the second device and/or the random password information of the second device in the second device, it indicates that the verification succeeds, or otherwise, it indicates the verification fails.

It should be noted that, the second device may not send the connection information to the first device in step S612, and may send the connection information only after the decryption performed by the second device succeeds in step S618.

Figure 7:
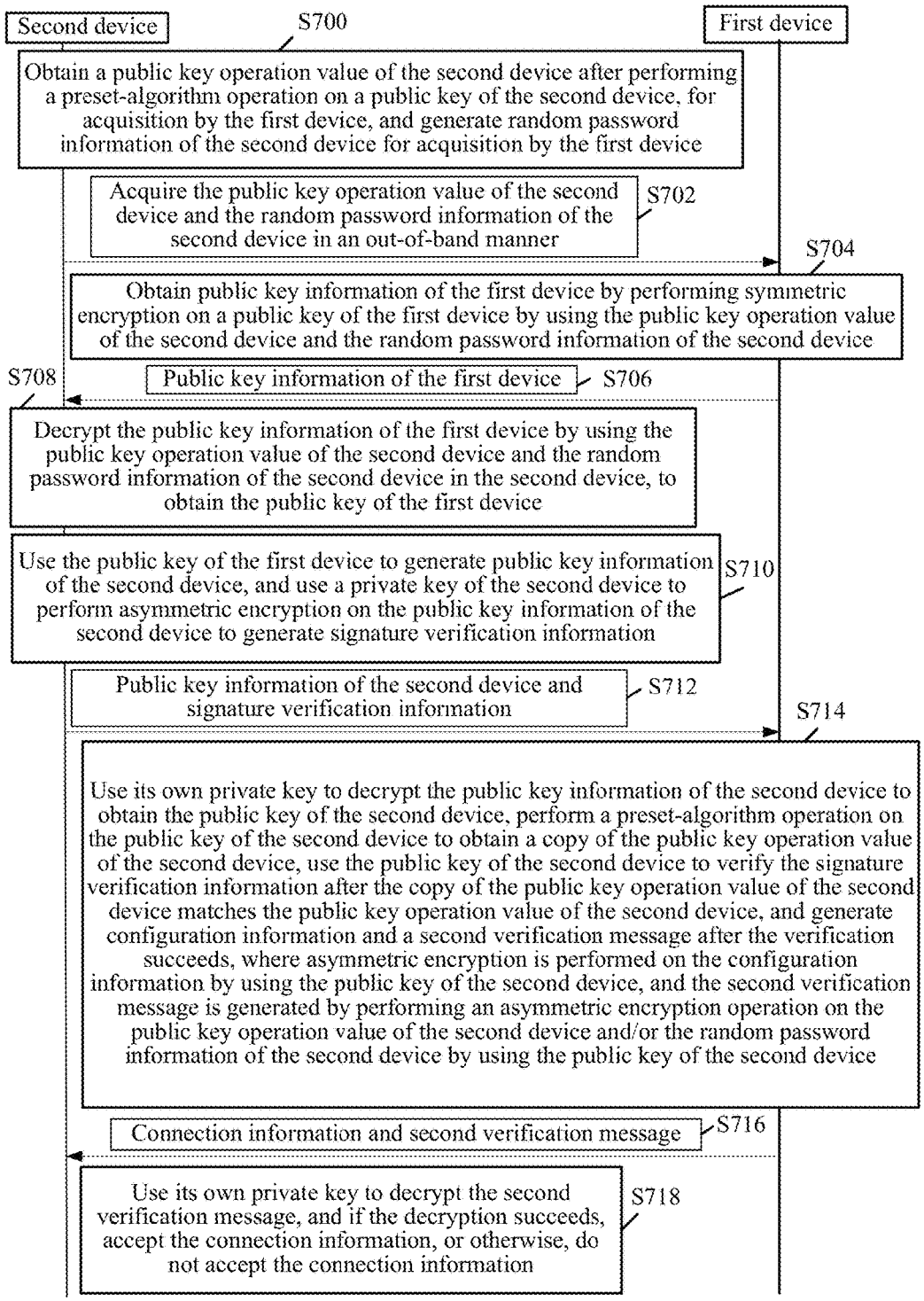
FIG. 7 is a schematic flowchart of a seventh embodiment of a secure connection method for a network device according to the present invention.

FIG. 7 shows a schematic flowchart of a sixth embodiment of a secure connection method for a network device according to the present invention, including:

Step S700: A second device obtains a public key operation value of the second device after performing a preset-algorithm operation on a public key of the second device, for acquisition by a first device, and generates random password information of the second device for acquisition by the first device.

Step S702: The first device acquires the public key operation value of the second device and the random password information of the second device in an out-of-band manner.

Step S704: The first device obtains public key information of the first device by performing symmetric encryption on a public key of the first device by using the public key operation value of the second device and the random password information of the second device.

Step S706: The first device sends the public key information of the first device to the second device.

Step S708: The second device decrypts the public key information of the first device by using the public key operation value of the second device and the random password information of the second device in the second device, to obtain the public key of the first device.

Step S710: The second device uses the public key of the first device to generate public key information of the second device, and uses a private key of the second device to perform asymmetric encryption on the public key information of the second device to generate signature verification information.

Step S712: The second device sends the public key information of the second device and the signature verification information to the first device.

Step S714: The first device uses its own private key to decrypt the public key information of the second device to obtain the public key of the second device, performs a preset-algorithm operation on the public key of the second device to obtain a copy of the public key operation value of the second device, uses the public key of the second device to verify the signature verification information after the copy of the public key operation value of the second device matches the public key operation value of the second device, and generates connection information and a second verification message after the verification succeeds, where asymmetric encryption is performed on the connection information by using the public key of the second device, and the second verification message is generated by performing an asymmetric encryption operation on the public key operation value of the second device and/or the random password information of the second device by using the public key of the second device.

Step S716: The first device sends the connection information and the second verification message to the second device.

Step S718: The second device uses its own private key to decrypt the second verification message, and if the decryption succeeds, accepts the connection information, or otherwise, does not accept the connection information.

Specifically, if the public key operation value of the second device and/or the random password information of the second device that is obtained by decrypting the second verification message is the same as the public key operation value of the second device and/or the random password information of the second device in the second device, it indicates that the verification succeeds, or otherwise, the verification fails.

Figure 8:
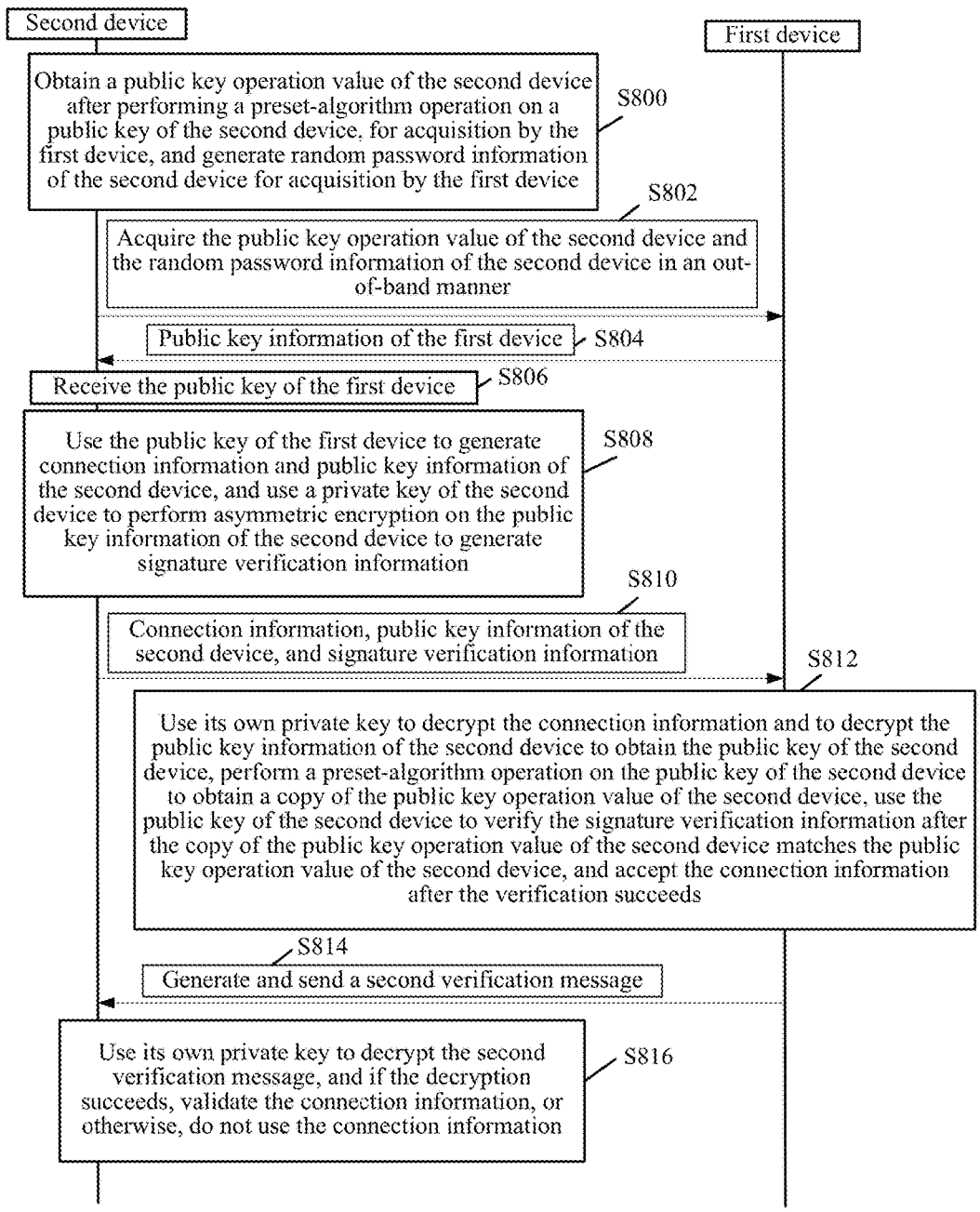
FIG. 8 is a schematic flowchart of an eighth embodiment of a secure connection method for a network device according to the present invention.

FIG. 8 shows a schematic flowchart of a seventh embodiment of a secure connection method for a network device according to the present invention, including:

Step S800: A second device obtains a public key operation value of the second device after performing a preset-algorithm operation on a public key of the second device, for acquisition by a first device, and generates random password information of the second device for acquisition by the first device.

Step S802: The first device acquires the public key operation value of the second device and the random password information of the second device in an out-of-band manner.

Step S804: The first device sends a public key of the first device to the second device.

Step S806: The second device receives the public key of the first device.

Step S808: The second device uses the public key of the first device to generate connection information and public key information of the second device, and uses a private key of the second device to perform asymmetric encryption on the public key information of the second device to generate signature verification information.

Step S810: The second device sends the connection information, the public key information of the second device, and the signature verification information to the first device.

Step S812: The first device uses its own private key to decrypt the connection information and to decrypt the public key information of the second device to obtain the public key of the second device, performs a preset-algorithm operation on the public key of the second device to obtain a copy of the public key operation value of the second device, uses the public key of the second device to verify the signature verification information after the copy of the public key operation value of the second device matches the public key operation value of the second device, and accepts the connection information after the verification succeeds.

Step S814: The first device uses the public key of the second device to perform an asymmetric encryption operation on the public key operation value of the second device and/or the random password information of the second device to generate a second verification message, and sends the second verification message to the second device.

Step S816: The second device uses its own private key to decrypt the second verification message, and if the decryption succeeds, validates the connection information, or otherwise, does not use the connection information.

Specifically, if the public key operation value of the second device and/or the random password information of the second device that is obtained by decrypting the second verification message is the same as the public key operation value of the second device and/or the random password information of the second device in the second device, it indicates that the verification succeeds, or otherwise, the verification fails.

It should be noted that, the second device may not send the connection information to the first device in step S810, and may send the connection information only after the decryption performed by the second device succeeds in step S816.

Figure 9:
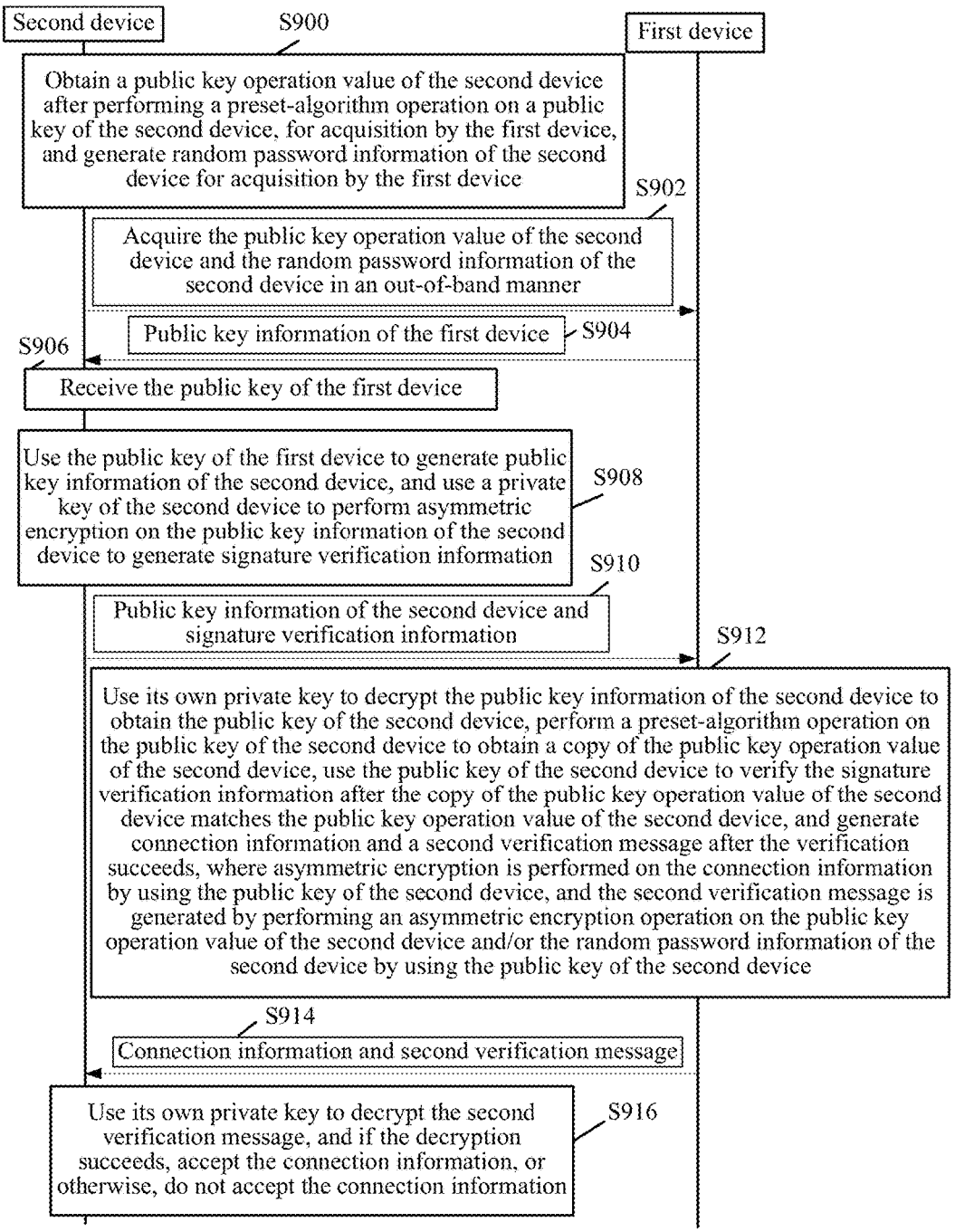
FIG. 9 is a schematic flowchart of a ninth embodiment of a secure connection method for a network device according to the present invention.

FIG. 9 shows a schematic flowchart of an eighth embodiment of a secure connection method for a network device according to the present invention, including:

Step S900: A second device obtains a public key operation value of the second device after performing a preset-algorithm operation on a public key of the second device, for acquisition by a first device, and generates random password information of the second device for acquisition by the first device.

Step S902: The first device acquires the public key operation value of the second device and the random password information of the second device in an out-of-band manner.

Step S904: The first device sends a public key of the first device to the second device.

Step S906: The second device receives the public key of the first device.

Step S908: The second device uses the public key of the first device to generate public key information of the second device, and uses a private key of the second device to perform asymmetric encryption on the public key information of the second device to generate signature verification information.

Step S910: The second device sends the public key information of the second device and the signature verification information to the first device.

Step S912: The first device uses its own private key to decrypt the public key information of the second device to obtain the public key of the second device, performs a preset-algorithm operation on the public key of the second device to obtain a copy of the public key operation value of the second device, uses the public key of the second device to verify the signature verification information after the copy of the public key operation value of the second device matches the public key operation value of the second device, and generates connection information and a second verification message after the verification succeeds, where asymmetric encryption is performed on the connection information by using the public key of the second device, and the second verification message is generated by performing an asymmetric encryption operation on the public key operation value of the second device and/or the random password information of the second device by using the public key of the second device.

Step S914: The first device sends the connection information and the second verification message to the second device.

Step S916: The second device uses its own private key to decrypt the second verification message, and if the decryption succeeds, accepts the connection information, or otherwise, does not accept the connection information.

Specifically, if the public key operation value of the second device and/or the random password information of the second device that is obtained by decrypting the second verification message is the same as the public key operation value of the second device and/or the random password information of the second device in the second device, it indicates that the verification succeeds, or otherwise, the verification fails.

Figure 10:
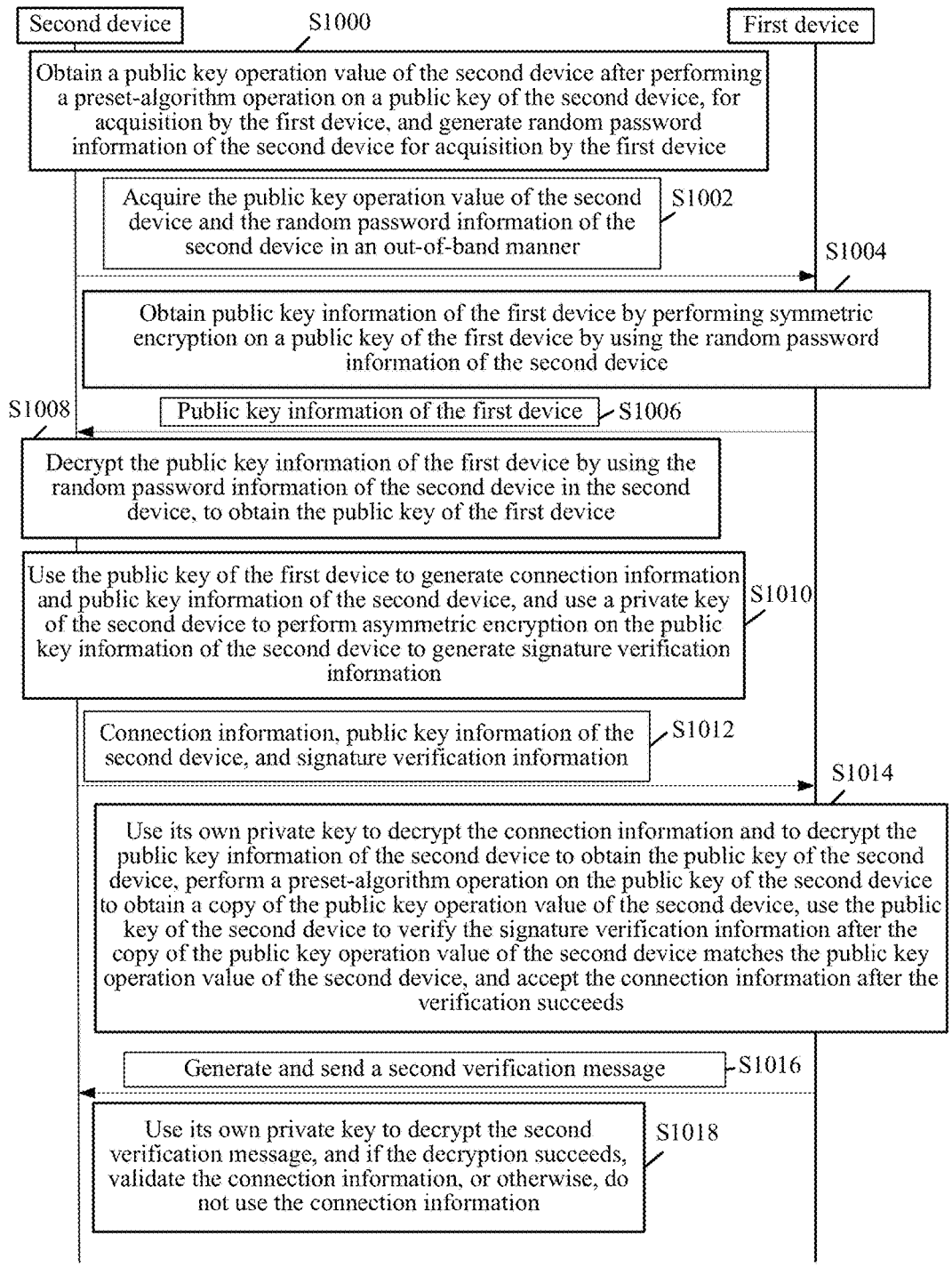
FIG. 10 is a schematic flowchart of a tenth embodiment of a secure connection method for a network device according to the present invention.

FIG. 10 shows a schematic flowchart of a ninth embodiment of a secure connection method for a network device according to the present invention, including:

Step S1000: A second device obtains a public key operation value of the second device after performing a preset-algorithm operation on a public key of the second device, for acquisition by a first device, and generates random password information of the second device for acquisition by the first device.

Step S1002: The first device acquires the public key operation value of the second device and the random password information of the second device in an out-of-band manner.

Step S1004: The first device obtains public key information of the first device by performing symmetric encryption on a public key of the first device by using the random password information of the second device.

Step S1006: The first device sends the public key information of the first device to the second device.

Step S1008: The second device decrypts the public key information of the first device by using the random password information of the second device in the second device, to obtain the public key of the first device.

Step S1010: The second device uses the public key of the first device to generate connection information and public key information of the second device, and uses a private key of the second device to perform asymmetric encryption on the public key information of the second device to generate signature verification information.

Step S1012: The second device sends the connection information, the public key information of the second device, and the signature verification information to the first device.

Step S1014: The first device uses its own private key to decrypt the connection information and to decrypt the public key information of the second device to obtain the public key of the second device, performs a preset-algorithm operation on the public key of the second device to obtain a copy of the public key operation value of the second device, uses the public key of the second device to verify the signature verification information after the copy of the public key operation value of the second device matches the public key operation value of the second device, and accepts the connection information after the verification succeeds.

Step S1016: The first device uses the public key of the second device to perform an asymmetric encryption operation on the public key operation value of the second device and/or the random password information of the second device to generate a second verification message, and sends the second verification message to the second device.

Step S1018: The second device uses its own private key to decrypt the second verification message, and if the decryption succeeds, validates the connection information, or otherwise, does not use the connection information.

Specifically, if the public key operation value of the second device and/or the random password information of the second device that is obtained by decrypting the second verification message is the same as the public key operation value of the second device and/or the random password information of the second device in the second device, it indicates that the verification succeeds, or otherwise, the verification fails.

It should be noted that, the second device may not send the connection information to the first device in step S1012, and may send the connection information only after the decryption performed by the second device succeeds in step S1018.

Figure 11:
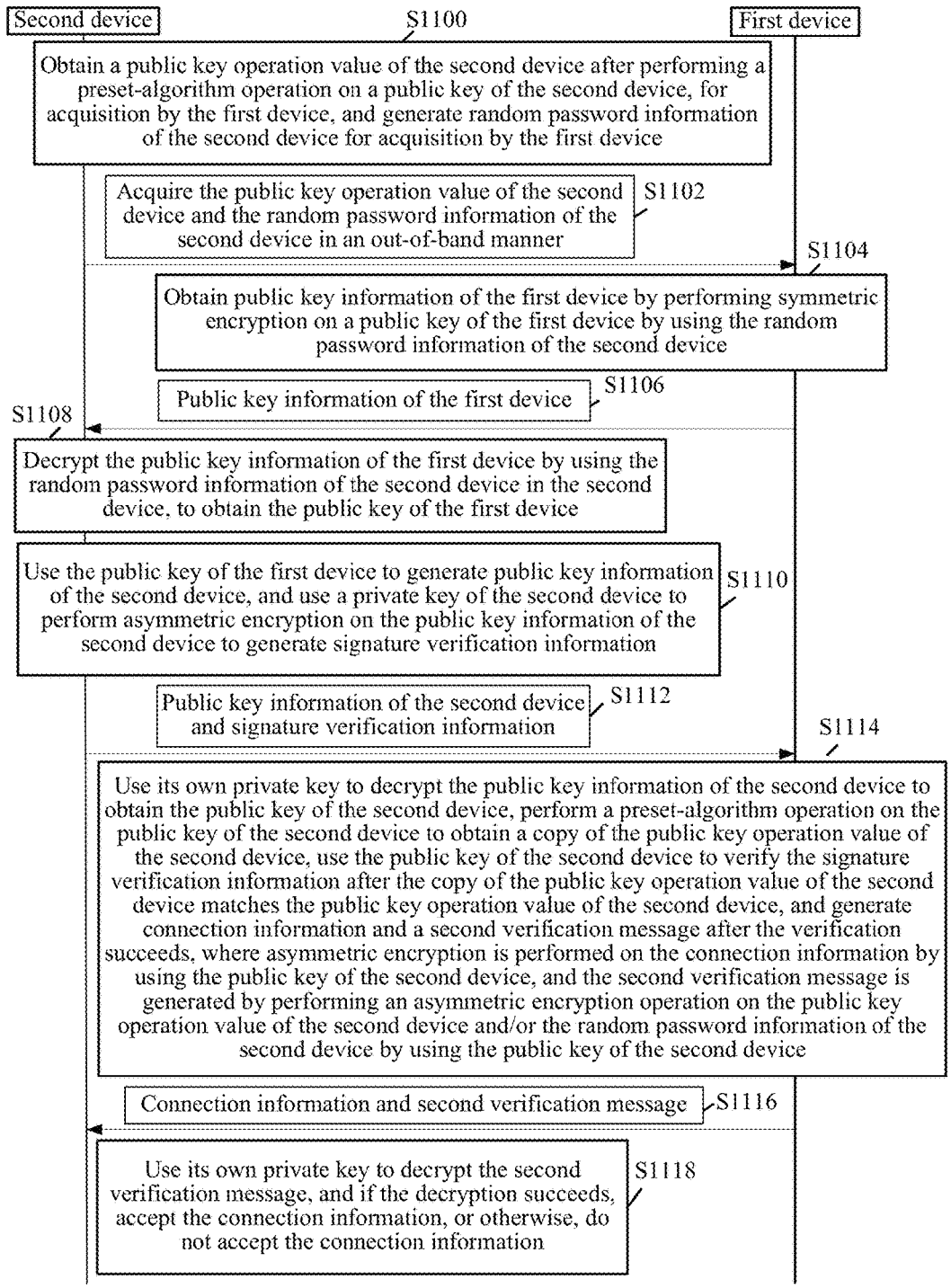
FIG. 11 is a schematic flowchart of a eleventh embodiment of a secure connection method for a network device according to the present invention

FIG. 11 shows a schematic flowchart of a tenth embodiment of a secure connection method for a network device according to the present invention, including:

Step S1100: A second device obtains a public key operation value of the second device after performing a preset-algorithm operation on a public key of the second device, for acquisition by a first device, and generates random password information of the second device for acquisition by the first device.

Step S1102: The first device acquires the public key operation value of the second device and the random password information of the second device in an out-of-band manner.

Step S1104: The first device obtains public key information of the first device by performing symmetric encryption on a public key of the first device by using the random password information of the second device.

Step S1106: The first device sends the public key information of the first device to the second device.

Step S1108: The second device decrypts the public key information of the first device by using the random password information of the second device in the second device, to obtain the public key of the first device.

Step S1110: The second device uses the public key of the first device to generate public key information of the second device, and uses a private key of the second device to perform asymmetric encryption on the public key information of the second device to generate signature verification information.

Step S1112: The second device sends the public key information of the second device and the signature verification information to the first device.

Step S1114: The first device uses its own private key to decrypt the public key information of the second device to obtain the public key of the second device, performs a preset-algorithm operation on the public key of the second device to obtain a copy of the public key operation value of the second device, uses the public key of the second device to verify the signature verification information after the copy of the public key operation value of the second device matches the public key operation value of the second device, and generates connection information and a second verification message after the verification succeeds, where asymmetric encryption is performed on the connection information by using the public key of the second device, and the second verification message is generated by performing an asymmetric encryption operation on the public key operation value of the second device and/or the random password information of the second device by using the public key of the second device.

Step S1116: The first device sends the connection information and the second verification message to the second device.

Step S1118: The second device uses its own private key to decrypt the second verification message, and if the decryption succeeds, accepts the connection information, or otherwise, does not accept the connection information.

Specifically, if the public key operation value of the second device and/or the random password information of the second device that is obtained by decrypting the second verification message is the same as the public key operation value of the second device and/or the random password information of the second device in the second device, it indicates that the verification succeeds, or otherwise, the verification fails.

It should be noted that step S406, step S506, step S606, step S706, step S804, step S904, step S1006, and step S1106 in the foregoing embodiments in FIG. 4 to FIG. 11 may further include: the first device generates a verification value by using the public key operation value of the second device, to prove that the first device has the public key operation value of the second device, and sends the verification value to the second device, so that the second device verifies the verification value by using the public key operation value of the second device in the second device.

By implementing the embodiments of the present invention, an operation is performed on a public key to obtain a public key operation value, and the public key operation value is used to replace a complete public key in information exchanged in a connection process, which can reduce content of exchanged information, improve utilization of an out-of-band channel connecting two devices, and improve security of the connection process; when a network connection is performed by scanning a multi-dimensional code, encoded content of the multi-dimensional code can be reduced greatly, requirements on displaying, scanning, and decoding of the multi-dimensional code are reduced, applicability is high, and connection efficiency is improved greatly, which greatly improve connection experience of a user; in addition, a connection can be performed by using the public key operation value with reference to random password information, which improves security of the connection process greatly.

Figure 12:
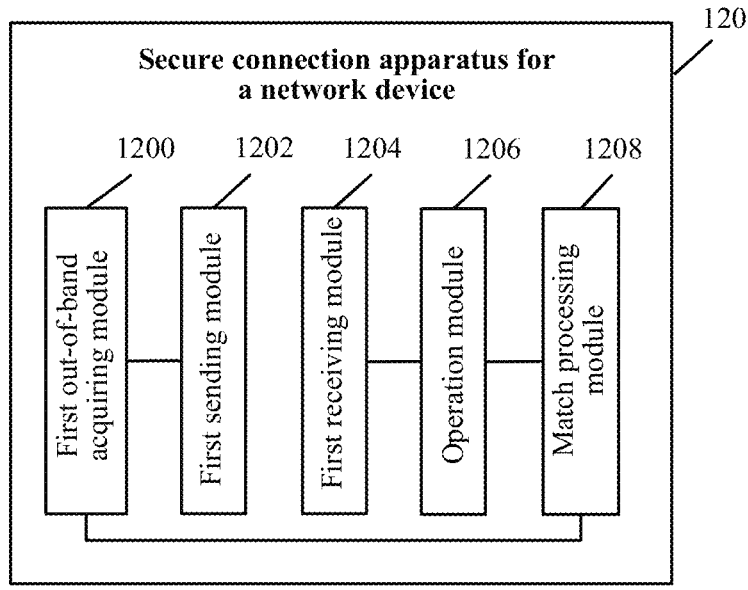
FIG. 12 is a schematic structural diagram of a first embodiment of a secure connection apparatus for a network device according to the present invention.

To better implement the foregoing solutions of the embodiments of the present invention, the present invention further provides a related apparatus for cooperating in implementing the foregoing solutions. FIG. 12 shows a schematic structural diagram of a first embodiment of a secure connection apparatus 120 for a network device according to the present invention. The following describes the apparatus in detail with reference to FIG. 12.

The secure connection apparatus 120 for a network device includes a first out-of-band acquiring module 1200, a first sending module 1202, a first receiving module 1204, an operation module 1206, and a match processing module 1208, where:

the first out-of-band acquiring module 1200 is configured to acquire a public key operation value of a second device in an out-of-band manner, where the public key operation value of the second device is a value obtained by performing a preset-algorithm operation on a public key of the second device;

the first sending module 1202 is configured to send public key information of a first device to the second device, so that the second device obtains a public key of the first device according to the public key information of the first device;

the first receiving module 1204 is configured to receive public key information of the second device that is encrypted by using the public key of the first device and sent by the second device, and decrypt the encrypted public key information of the second device by using a private key of the first device, to obtain the public key of the second device;

the operation module 1206 is configured to perform a preset-algorithm operation on the public key of the second device to obtain a copy of the public key operation value of the second device; and the match processing module 1208 is configured to: when matching the copy of the public key operation value of the second device with the public key operation value of the second device, accept received connection information sent by the second device, or generate connection information and send the connection information to the second device.

Specifically, when receiving the public key information of the second device that is encrypted by using the public key of the first device and sent by the second device, the first receiving module 1204 further receives signature verification information sent by the second device, where the signature verification information is information obtained by the second device by performing asymmetric encryption by using a private key of the second device.

Figure 13:
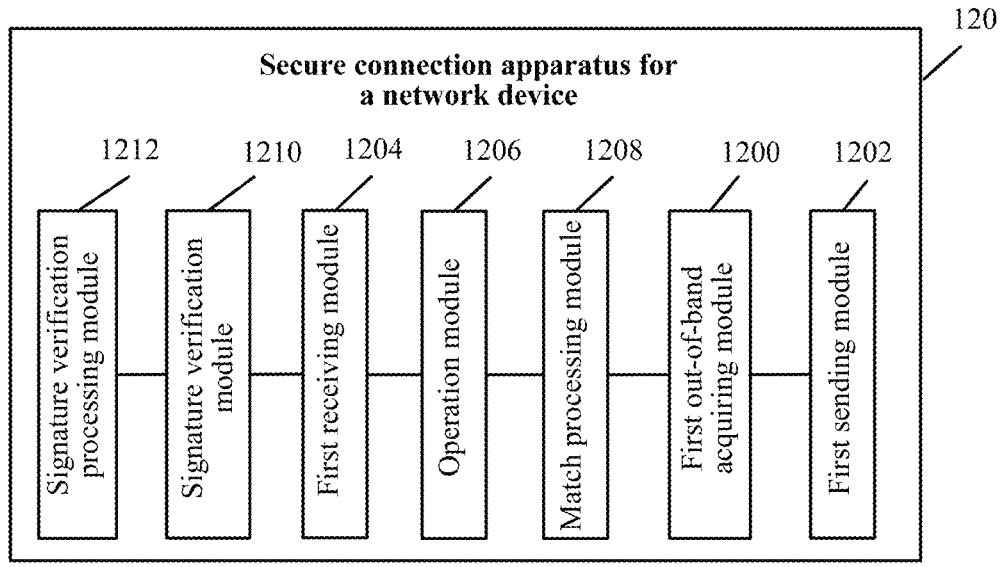
FIG. 13 is a schematic structural diagram of a second embodiment of a secure connection apparatus for a network device according to the present invention.

FIG. 13 shows a schematic structural diagram of a second embodiment of a secure connection apparatus for a network device according to the present invention. The following describes the apparatus in detail.

The secure connection apparatus 120 for a network device may further include a signature verification module 1210 and a signature verification processing module 1212, in addition to the first out-of-band acquiring module 1200, the first sending module 1202, the first receiving module 1204, the operation module 1206, and the match processing module 1208, where:

the signature verification module 1210 is configured to verify the signature verification information by using the public key of the second device; and the signature verification processing module 1212 is configured to: if the verification by the signature verification module 1210 succeeds, perform the step of accepting received connection information sent by the second device, or generating connection information and sending the connection information to the second device; or if the verification by the signature verification module 1210 fails, terminate a connection process.

More specifically, the public key information of the first device may include the public key of the first device, or information obtained by performing symmetric encryption on the public key of the first device by using the public key operation value of the second device.

Figure 14:
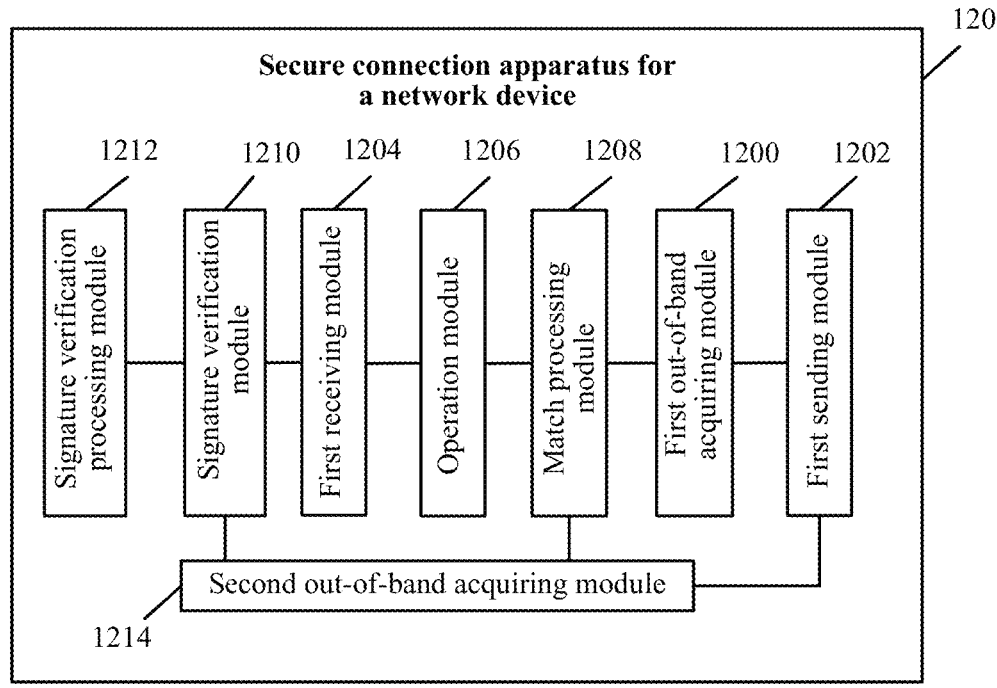
FIG. 14 is a schematic structural diagram of a third embodiment of a secure connection apparatus for a network device according to the present invention.

FIG. 14 shows a schematic structural diagram of a third embodiment of a secure connection apparatus for a network device according to the present invention. The following describes the apparatus in detail.

The secure connection apparatus 120 for a network device may further include a second out-of-band acquiring module 1214, in addition to the first out-of-band acquiring module 1200, the first sending module 1202, the first receiving module 1204, the operation module 1206, the match processing module 1208, the signature verification module 1210, and the signature verification processing module 1212, where:

the second out-of-band acquiring module 1214 is configured to acquire random password information of the second device in the out-of-band manner, where the public key information of the first device includes the public key of the first device, or information obtained by performing symmetric encryption on the public key of the first device by using the public key operation value of the second device, or information obtained by performing symmetric encryption on the public key of the first device by using the public key operation value of the second device and the random password information of the second device, or information obtained by performing symmetric encryption on the public key of the first device by using the random password information of the second device.

Specifically, when receiving the public key information of the second device, the first receiving module 1204 may further receive the connection information generated by the second device, where asymmetric encryption is performed on the connection information by using the public key of the first device; and the secure connection apparatus 120 for a network device may further include a connection information decryption module, configured to decrypt the connection information by using the private key of the first device.

Figure 15:
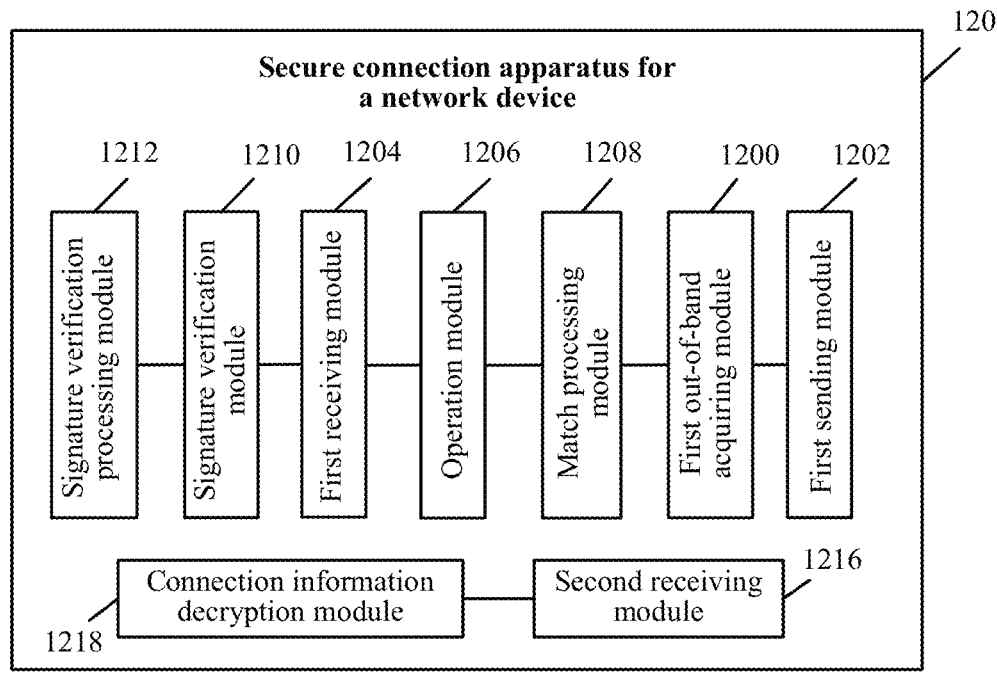
FIG. 15 is a schematic structural diagram of a fourth embodiment of a secure connection apparatus for a network device according to the present invention.

FIG. 15 shows a schematic structural diagram of a fourth embodiment of a secure connection apparatus for a network device according to the present invention. The following describes the apparatus in detail.

The secure connection apparatus 120 for a network device may further include a second receiving module 1216 and a connection information decryption module 1218, in addition to the first out-of-band acquiring module 1200, the first sending module 1202, the first receiving module 1204, the operation module 1206, the match processing module 1208, the signature verification module 1210, and the signature verification processing module 1212, where:

the second receiving module 1216 is configured to: after the first receiving module 1204 receives the public key information of the second device that is encrypted by using the public key of the first device and sent by the second device, receive the connection information sent by the second device, where asymmetric encryption is performed on the connection information by using the public key of the first device; and the connection information decryption module 1218 is configured to decrypt the connection information by using the private key of the first device.

Figure 16:
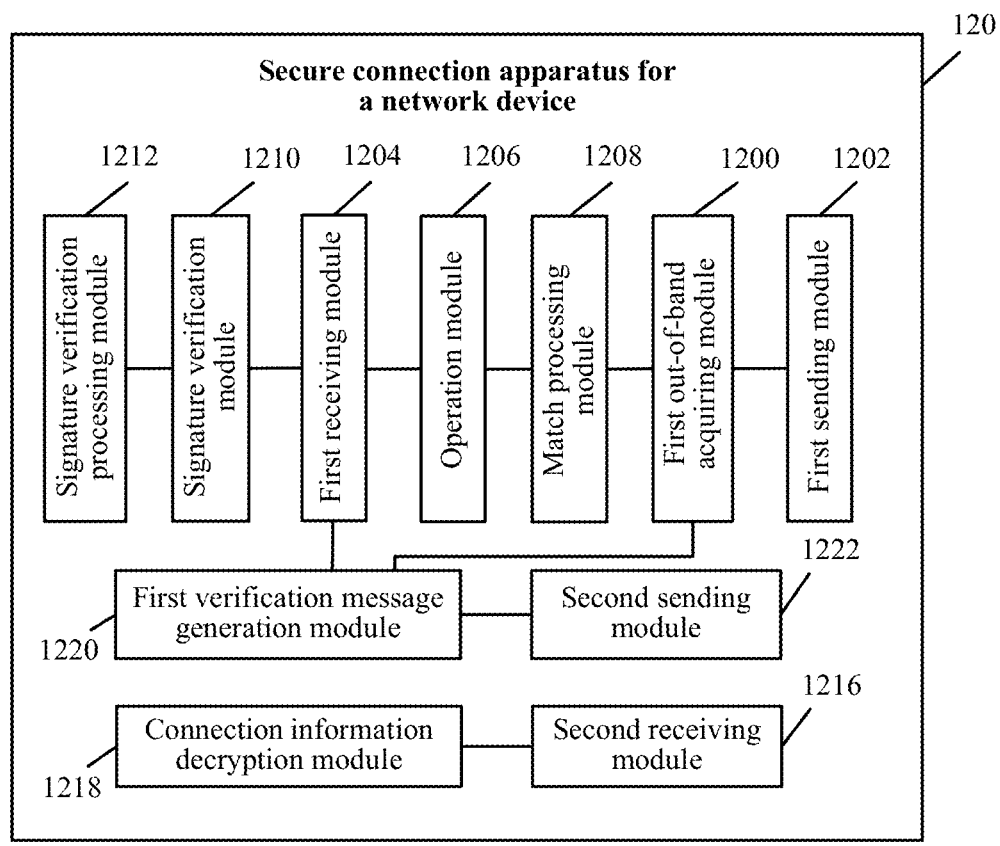
FIG. 16 is a schematic structural diagram of a fifth embodiment of a secure connection apparatus for a network device according to the present invention.

FIG. 16 shows a schematic structural diagram of a fifth embodiment of a secure connection apparatus for a network device according to the present invention. The following describes the apparatus in detail.

The secure connection apparatus 120 for a network device may further include a first verification message generation module 1220 and a second sending module 1222, in addition to the first out-of-band acquiring module 1200, the first sending module 1202, the first receiving module 1204, the operation module 1206, the match processing module 1208, the signature verification module 1210, the signature verification processing module 1212, the second receiving module 1216, and the connection information decryption module 1218, where:

the first verification message generation module 1220 is configured to: after the match processing module 1208 matches the copy of the public key operation value of the second device with the public key operation value of the second device, and before the second receiving module 1216 receives the connection information sent by the second device, use the public key of the second device to perform an asymmetric encryption operation on the public key operation value of the second device or on a signature that is generated by using the private key of the first device, to generate a first verification message; and the second sending module 1222 is configured to send the first verification message to the second device.

Figure 17:
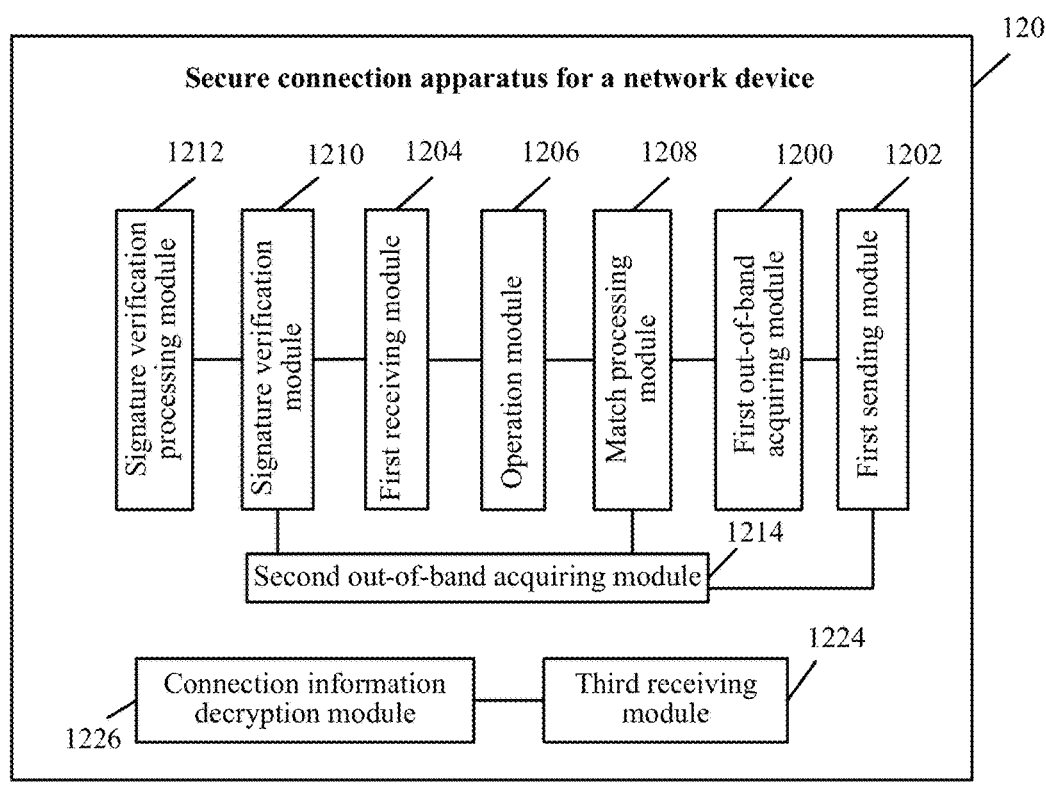
FIG. 17 is a schematic structural diagram of a sixth embodiment of a secure connection apparatus for a network device according to the present invention.

FIG. 17 shows a schematic structural diagram of a sixth embodiment of a secure connection apparatus for a network device according to the present invention. The following describes the apparatus in detail.

The secure connection apparatus 120 for a network device may further include a third receiving module 1224 and a connection information decryption module 1226, in addition to the first out-of-band acquiring module 1200, the first sending module 1202, the first receiving module 1204, the operation module 1206, the match processing module 1208, the signature verification module 1210, the signature verification processing module 1212, and the second out-of-band acquiring module 1214, where:

the third receiving module 1224 is configured to: after the first receiving module 1204 receives the public key information of the second device that is encrypted by using the public key of the first device and sent by the second device, receive the connection information sent by the second device, where asymmetric encryption is performed on the connection information by using the public key of the first device; and the connection information decryption module 1226 is configured to decrypt the connection information by using the private key of the first device.

Figure 18:
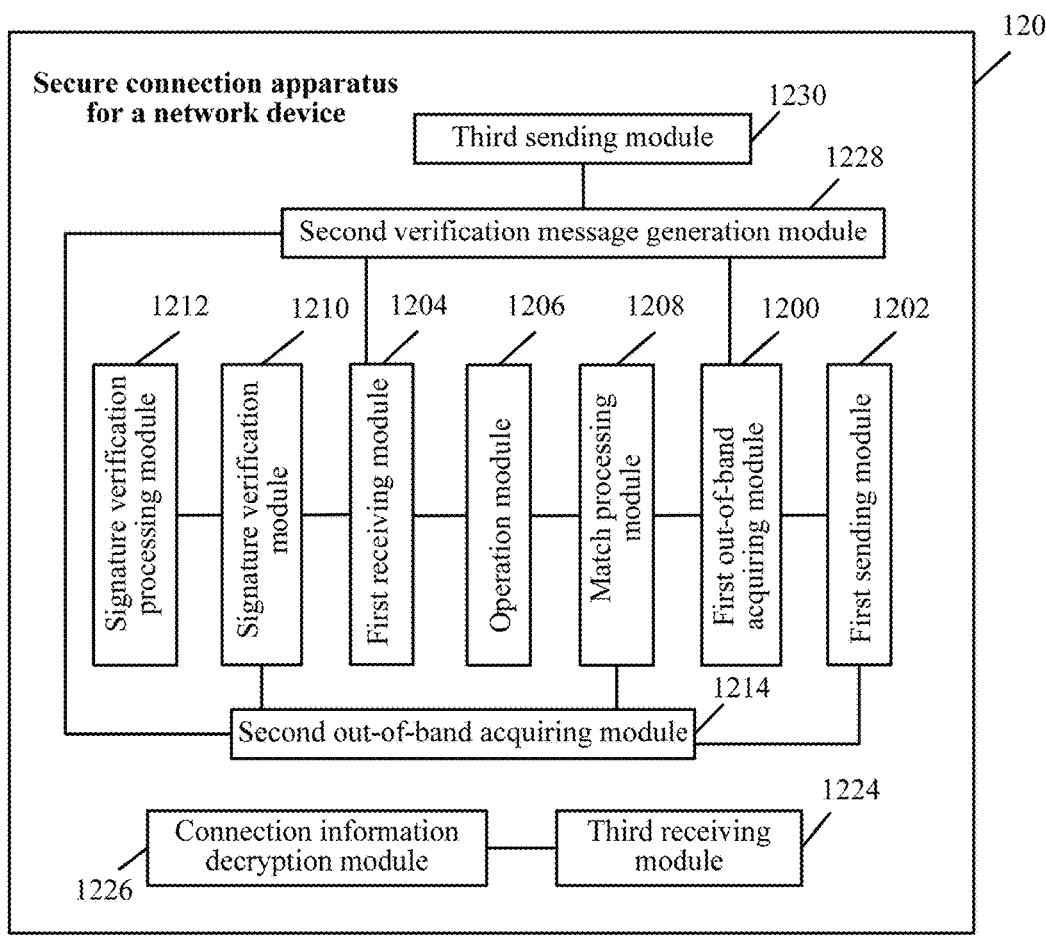
FIG. 18 is a schematic structural diagram of a seventh embodiment of a secure connection apparatus for a network device according to the present invention.

FIG. 18 shows a schematic structural diagram of a seventh embodiment of a secure connection apparatus for a network device according to the present invention. The following describes the apparatus in detail.

The secure connection apparatus 120 for a network device may further include a second verification message generation module 1228 and a third sending module 1230, in addition to the first out-of-band acquiring module 1200, the first sending module 1202, the first receiving module 1204, the operation module 1206, the match processing module 1208, the signature verification module 1210, the signature verification processing module 1212, the second out-of-band acquiring module 1214, the third receiving module 1224, and the connection information decryption module 1226, where:

the second verification message generation module 1228 is configured to: after the match processing module 1208 matches the copy of the public key operation value of the second device with the public key operation value of the second device, and before the third receiving module 1224 receives the connection information sent by the second device, use the public key of the second device to perform an asymmetric encryption operation on the public key operation value of the second device and/or on the random password information of the second device to generate a second verification message, or use the public key of the second device to perform an asymmetric encryption operation on a signature that is generated by using the private key of the first device, to generate a second verification message; and the third sending module 1230 is configured to send the second verification message to the second device.

It should be noted that the connection information decryption module 1218 and the connection information decryption module 1226 may be modules that have the same functions.

Still further, the secure connection apparatus 120 for a network device in this embodiment of the present invention may further include a third out-of-band acquiring module and a fourth sending module, where:

the third out-of-band acquiring module is configured to acquire a public key operation value of a third device in the out-of-band manner, where the public key operation value of the third device is a value obtained by performing a preset-algorithm operation on a public key of the third device; and the fourth sending module is configured to: after completing a network connection with the second device, send the public key operation value of the third device to the second device, so that the second device performs a network connection with the third device.

It should be noted that functions of functional modules in the secure connection apparatus 120 for a network device may be implemented specifically according to the methods in the foregoing method embodiments and are not further described herein.

Figure 19:
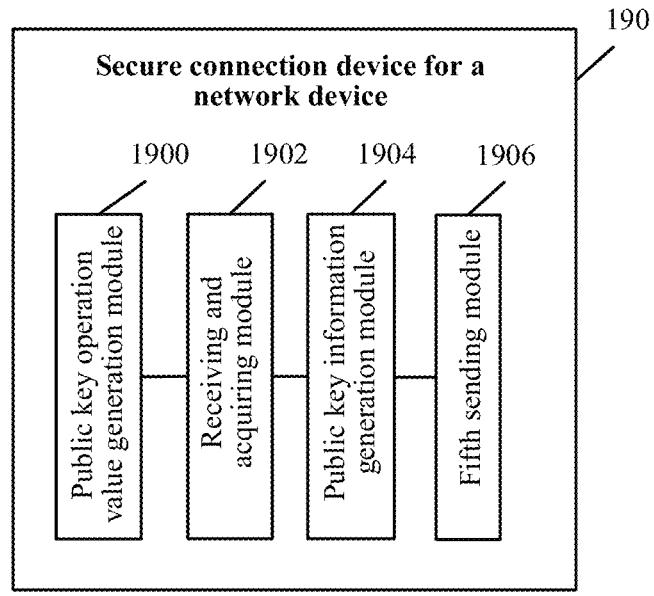
FIG. 19 is a schematic structural diagram of a first embodiment of a secure connection device for a network device according to the present invention.

To better implement the foregoing solutions of the embodiments of the present invention, the present invention further provides a related apparatus for cooperating in implementing the foregoing solutions. FIG. 19 shows a schematic structural diagram of a first embodiment of a secure connection device for a network device according to the present invention. The following describes the device in detail with reference to FIG. 19.

The secure connection device 190 for a network device includes a public key operation value generation module 1900, a receiving and acquiring module 1902, a public key information generation module 1904, and a fifth sending module 1906, where:

the public key operation value generation module 1900 is configured to generate a public key operation value of a second device, for acquisition by a first device in an out-of-band manner, where the public key operation value of the second device is a value obtained by performing a preset-algorithm operation on a public key of the second device;

the receiving and acquiring module 1902 is configured to receive public key information of the first device that is sent by the first device, and acquire a public key of the first device from the public key information of the first device;

the public key information generation module 1904 is configured to perform asymmetric encryption on the public key of the second device by using the public key of the first device, to generate public key information of the second device; and the fifth sending module 1906 is configured to send the public key information of the second device to the first device, so that after the first device obtains the public key of the second device, the first device performs a preset-algorithm operation on the public key of the second device to obtain a copy of the public key operation value of the second device, and that after the copy of the public key operation value of the second device matches the public key operation value of the second device, the first device accepts received connection information sent by the second device, or generates connection information and sends the connection information to the second device.

Figure 20:
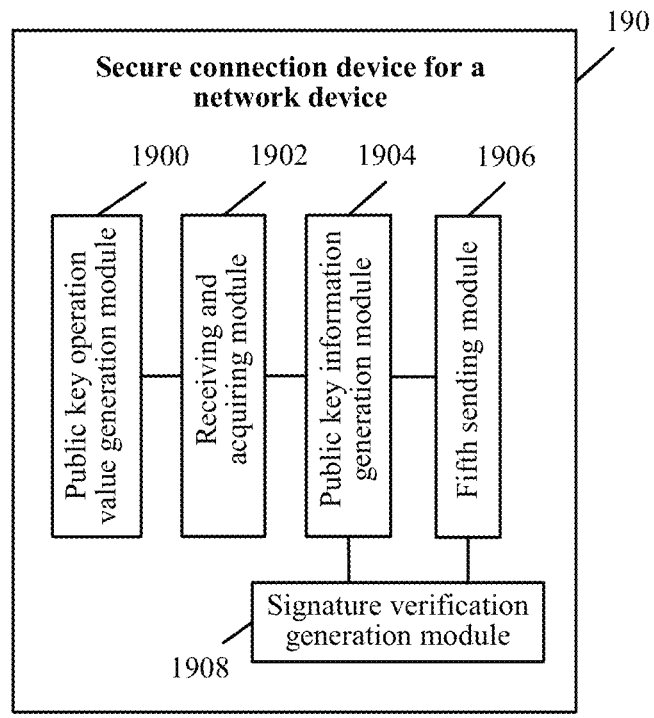
FIG. 20 is a schematic structural diagram of a second embodiment of a secure connection device for a network device according to the present invention.

FIG. 20 shows a schematic structural diagram of a second embodiment of a secure connection device for a network device according to the present invention. The following describes the device in detail.

The secure connection device 190 for a network device may further include a signature verification generation module 1908, in addition to the public key operation value generation module 1900, the receiving and acquiring module 1902, the public key information generation module 1904, and the fifth sending module 1906, where:

the signature verification generation module 1908 is configured to generate signature verification information according to a private key of the second device; and the fifth sending module 1906 further sends the signature verification information when sending the public key information of the second device, so that after the first device detects that the copy of the public key operation value of the second device matches the public key operation value of the second device, the first device verifies the signature verification information by using the public key of the second device.

Figure 21:
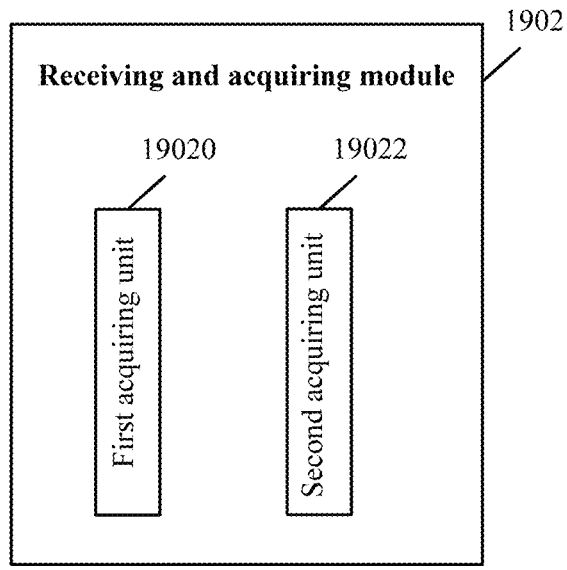
FIG. 21 is a schematic structural diagram of a first embodiment of a receiving and acquiring module according to the present invention.

Specifically, as shown in a schematic structural diagram of a first embodiment of the receiving and acquiring module 1902 shown in FIG. 21, the receiving and acquiring module 1902 includes a first acquiring unit 19020 and/or a second acquiring unit. In this embodiment of the present invention, both the two units are included for exemplary description, where:

the first acquiring unit 19020 is configured to: when the public key information of the first device is the public key of the first device, directly acquire the public key of the first device; and the second acquiring unit 19022 is configured to: when the public key information of the first device is information obtained by the first device by performing symmetric encryption on the public key of the first device by using the public key operation value of the second device, decrypt the public key information of the first device according to the public key operation value of the second device to acquire the public key of the first device.

Figure 22:
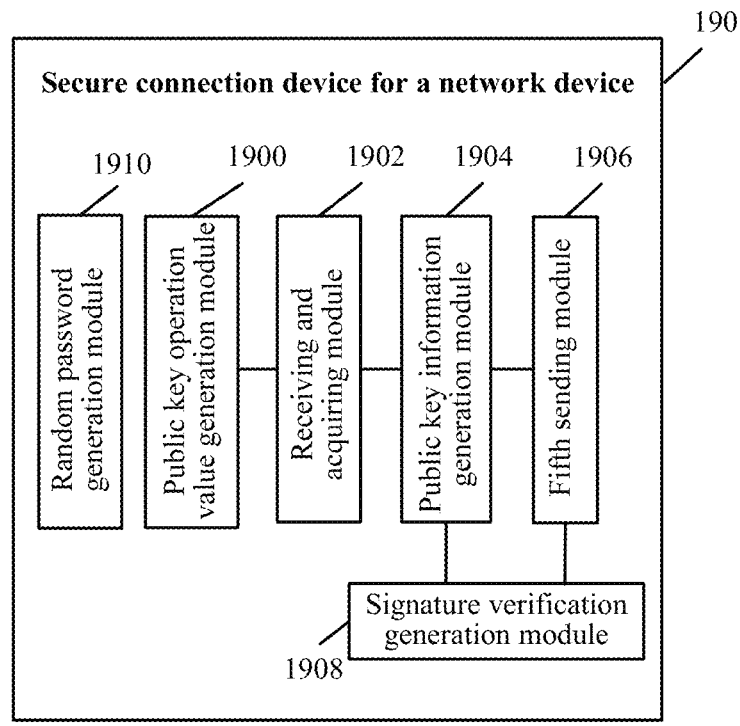
FIG. 22 is a schematic structural diagram of a third embodiment of a secure connection device for a network device according to the present invention.

FIG. 22 shows a schematic structural diagram of a third embodiment of a secure connection device for a network device according to the present invention. The following describes the device in detail.

The secure connection device 190 for a network device may further include a random password generation module 1910, in addition to the public key operation value generation module 1900, the receiving and acquiring module 1902, the public key information generation module 1904, the fifth sending module 1906, and the signature verification generation module 1908, where:

the random password generation module 1910 is configured to: before the receiving and acquiring module receives the public key information of the first device that is sent by the first device, generate random password information of the second device, for acquisition by the first device in the out-of-band manner.

Figure 23:
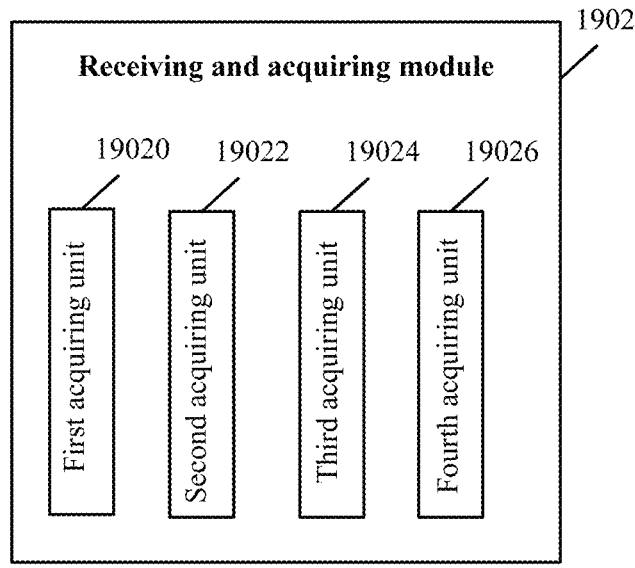
FIG. 23 is a schematic structural diagram of a second embodiment of a receiving and acquiring module according to the present invention.

Specifically, as shown in a schematic structural diagram of a second embodiment of the receiving and acquiring module shown in FIG. 23, the receiving and acquiring module 1902 includes the first acquiring unit 19020, and/or the second acquiring unit 19022, a third acquiring unit 19024, and/or a fourth acquiring unit 19026. In this embodiment of the present invention, all the four units are included for exemplary description, where:

the first acquiring unit 19020 is configured to: when the public key information of the first device is the public key of the first device, directly acquire the public key of the first device;

the second acquiring unit 19022 is configured to: when the public key information of the first device is information obtained by the first device by performing symmetric encryption on the public key of the first device by using the public key operation value of the second device, decrypt the public key information of the first device according to the public key operation value of the second device to acquire the public key of the first device;

the third acquiring unit 19024 is configured to: when the public key information of the first device is information obtained by the first device by performing symmetric encryption on the public key of the first device by using the random password information of the second device, decrypt the public key information of the first device according to the random password information of the second device to acquire the public key of the first device; and the fourth acquiring unit 19026 is configured to: when the public key information of the first device is information obtained by the first device by performing symmetric encryption on the public key of the first device by using the public key operation value of the second device and the random password information of the second device, decrypt the public key information of the first device according to the public key operation value of the second device and the random password information of the second device to acquire the public key of the first device.

Figure 24:
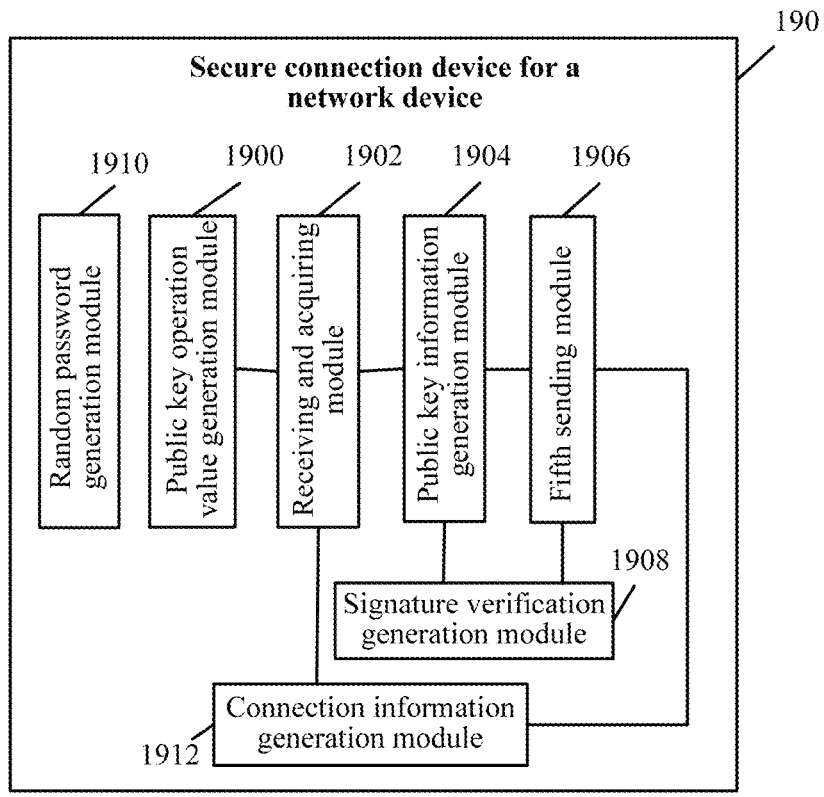
FIG. 24 is a schematic structural diagram of a fourth embodiment of a secure connection device for a network device according to the present invention.

FIG. 24 shows a schematic structural diagram of a fourth embodiment of a secure connection device for a network device according to the present invention. The following describes the device in detail.

The secure connection device 190 for a network device may further include a connection information generation module 1912, in addition to the public key operation value generation module 1900, the receiving and acquiring module 1902, the public key information generation module 1904, the fifth sending module 1906, the signature verification generation module 1908, and the random password generation module 1910, where:

the connection information generation module 1912 is configured to generate the connection information, where asymmetric encryption is performed on the connection information by using the public key of the first device; and the fifth sending module 1906 further sends the connection information when sending the public key information of the second device to the first device.

Figure 25:
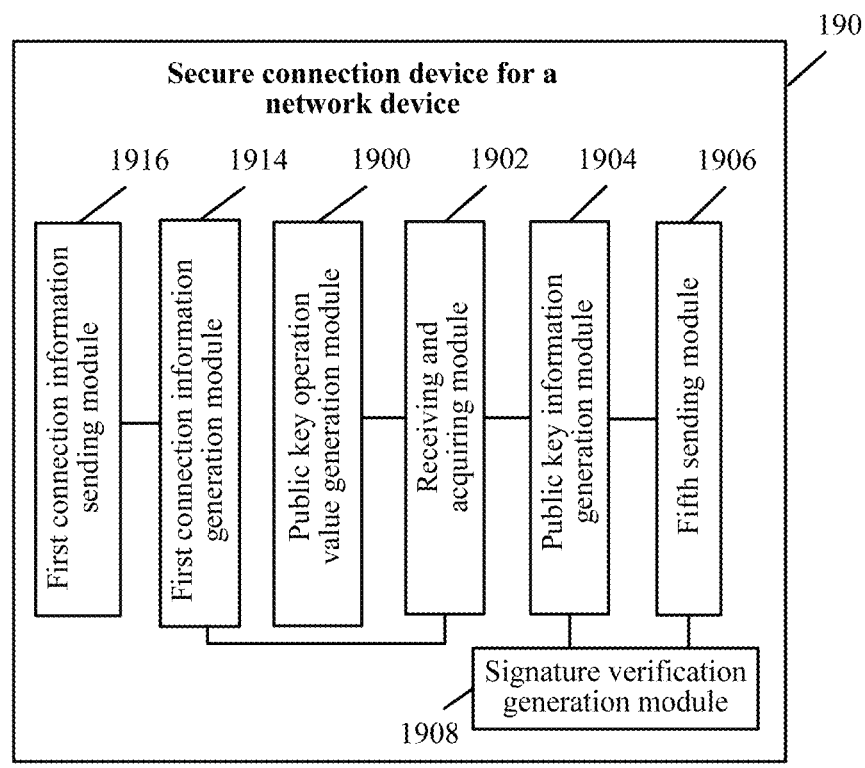
FIG. 25 is a schematic structural diagram of a fifth embodiment of a secure connection device for a network device according to the present invention.

FIG. 25 shows a schematic structural diagram of a fifth embodiment of a secure connection device for a network device according to the present invention. The following describes the device in detail.

The secure connection device 190 for a network device may further include a first connection information generation module 1914 and a first connection information sending module 1916, in addition to the public key operation value generation module 1900, the receiving and acquiring module 1902, the public key information generation module 1904, the fifth sending module 1906, and the signature verification generation module 1918, where:

the first connection information generation module 1914 is configured to: after the fifth sending module sends the public key information of the second device to the first device, generate the connection information, where asymmetric encryption is performed on the connection information by using the public key of the first device; and the first connection information sending module 1916 is configured to send the connection information to the first device.

Figure 26:
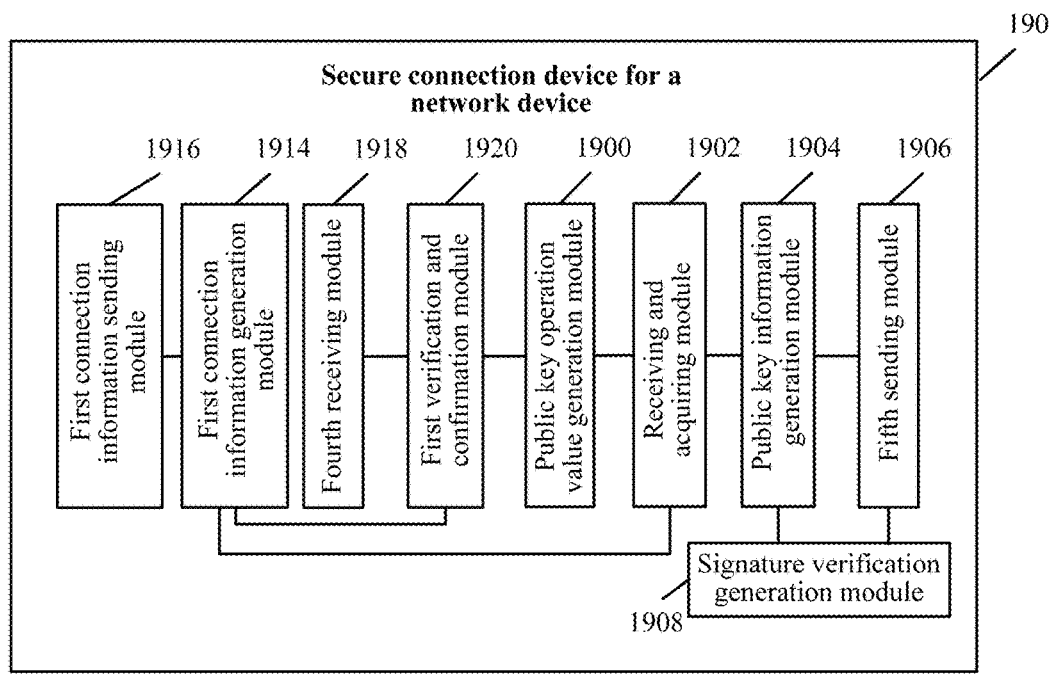
FIG. 26 is a schematic structural diagram of a sixth embodiment of a secure connection device for a network device according to the present invention.

FIG. 26 shows a schematic structural diagram of a sixth embodiment of a secure connection device for a network device according to the present invention. The following describes the device in detail.

The secure connection device 190 for a network device may further include a fourth receiving module 1918 and a first verification and confirmation module 1920, in addition to the public key operation value generation module 1900, the receiving and acquiring module 1902, the public key information generation module 1904, the fifth sending module 1906, the signature verification generation module 1908, the first connection information generation module 1914, and the first connection information sending module 1916, where:

the fourth receiving module 1918 is configured to: after the fifth sending module 1906 sends the public key information of the second device to the first device, and before the first connection information generation module 1914 generates the connection information, receive a first verification message sent by the first device, where the first verification message is generated by the first device by performing an asymmetric encryption operation on the public key operation value of the second device by using the public key of the second device; and the first verification and confirmation module 1920 is configured to: after successfully verifying the first verification message according to the private key of the second device, trigger the first connection information generation module to generate the connection information.

Figure 27:
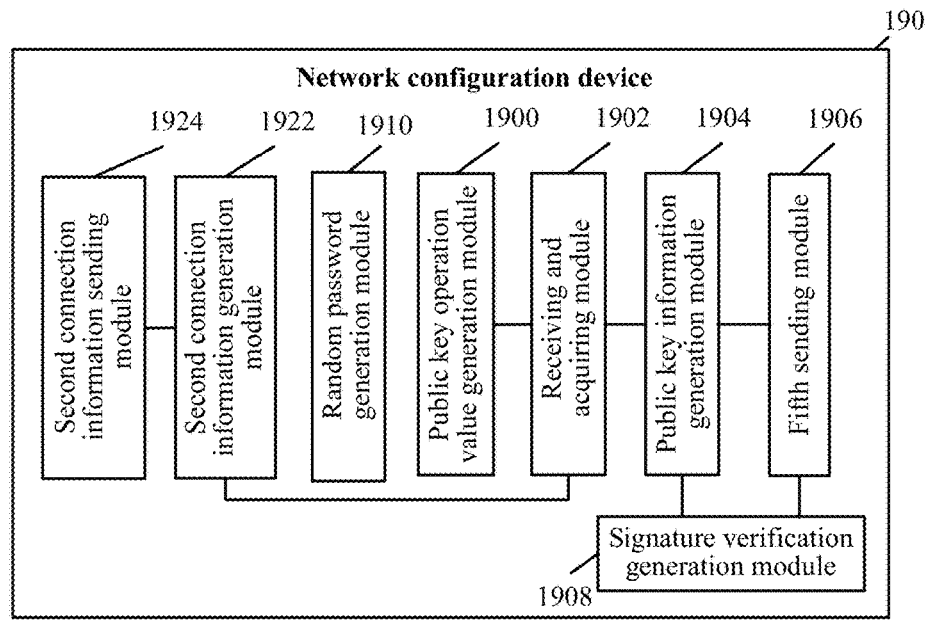
FIG. 27 is a schematic structural diagram of a seventh embodiment of a secure connection device for a network device according to an embodiment of the present invention.

FIG. 27 shows a schematic structural diagram of a seventh embodiment of a secure connection device for a network device according to the present invention. The following describes the device in detail.

The secure connection device 190 for a network device may further include a second connection information generation module 1922 and a second connection information sending module 1924, in addition to the public key operation value generation module 1900, the receiving and acquiring module 1902, the public key information generation module 1904, the fifth sending module 1906, the signature verification generation module 1908, and the random password generation module 1910, where:

the second connection information generation module 1922 is configured to: after the fifth sending module 1906 sends the public key information of the second device to the first device, generate the connection information, where asymmetric encryption is performed on the connection information by using the public key of the first device; and the second connection information sending module 1924 is configured to send the connection information to the first device.

Figure 28:
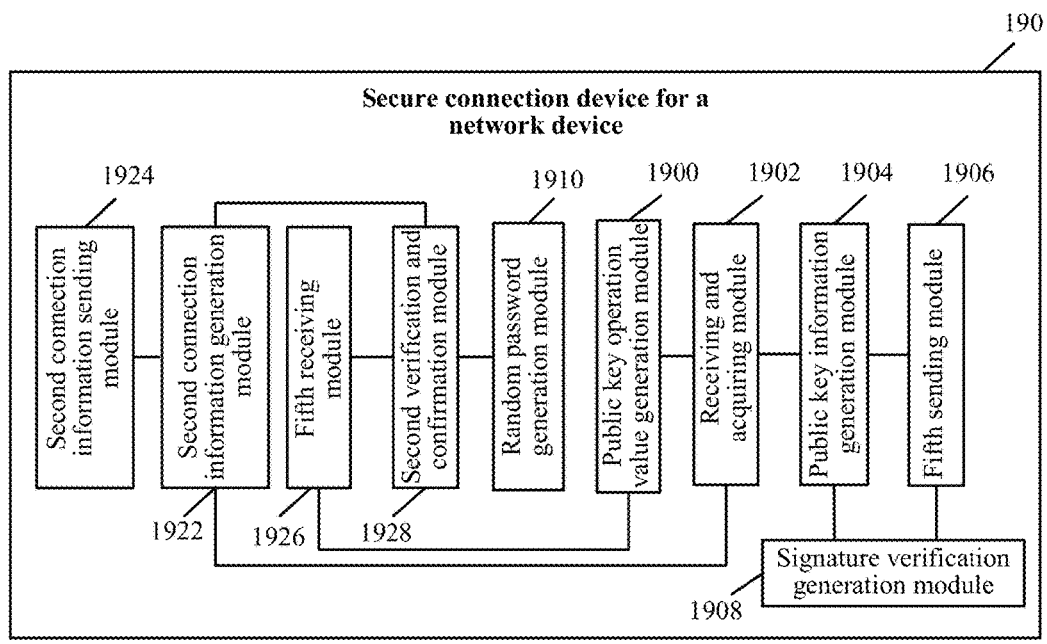
FIG. 28 is a schematic structural diagram of a eighth embodiment of a secure connection device for a network device according to an embodiment of the present invention.

FIG. 28 shows a schematic structural diagram of an eighth embodiment of a secure connection device for a network device according to the present invention. The following describes the device in detail.

The secure connection device 190 for a network device may further include a fifth receiving module 1926 and a second verification and confirmation module 1928, in addition to the public key operation value generation module 1900, the receiving and acquiring module 1902, the public key information generation module 1904, the fifth sending module 1906, the signature verification generation module 1908, the random password generation module 1910, the second connection information generation module 1922, and the second connection information sending module 1924, where:

the fifth receiving module 1926 is configured to: after the fifth sending module 1906 sends the public key information of the second device to the first device, and before the second connection information generation module 1922 generates the connection information, receive a second verification message sent by the first device, where the second verification message is generated by the first device by performing an asymmetric encryption operation on the public key operation value of the second device and/or the random password information of the second device by using the public key of the second device, or is generated by performing an asymmetric encryption operation by using the public key of the second device, on a signature that is generated by using a private key of the first device; and the second verification and confirmation module 1928 is configured to: after successfully verifying the second verification message according to the private key of the second device, trigger the second connection information generation module to generate the connection information.

Still further, the secure connection device 190 for a network device in this embodiment of the present invention may further include a sixth receiving module and a network connection module, where:

the sixth receiving module is configured to: after completing a network connection with the first device, receive a public key operation value of a third device that is sent by the first device, where the public key operation value of the third device is a value obtained by performing a preset-algorithm operation on a public key of the third device; and the network connection module performs a network connection with the third device.

It should be noted that functions of functional modules in the secure connection apparatus 190 for a network device may be implemented specifically according to the methods in the foregoing method embodiments and are not further described herein.

Figure 29:
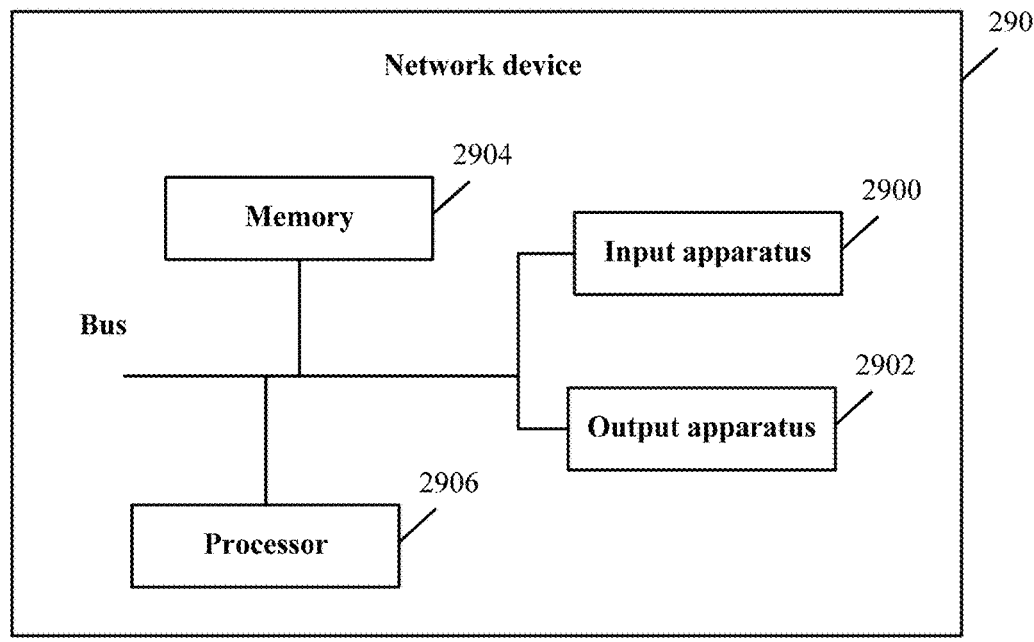
FIG. 29 is a schematic structural diagram of a first embodiment of a network device according to the present invention.

To better implement the foregoing solutions of the embodiments of the present invention, the present invention further provides a related device for cooperating in implementing the foregoing solutions. FIG. 29 shows a schematic structural diagram of a first embodiment of a network device according to the present invention. The following describes the network device in detail with reference to FIG. 29.

The network device 290 includes an input apparatus 2900, an output apparatus 2902, a memory 2904, and a processor 2906 (a quantity of processors 2906 in the network device may be one or more, and one processor is used as an example in FIG. 29). In some embodiments of the present invention, the input apparatus 2900, the output apparatus 2902, the memory 2904 and the processor 2906 may be connected by using a bus or in other manners, where the connection by using a bus is used as an example in FIG. 29.

The memory 2904 is configured to store program code, and the processor 2906 is configured to invoke the program code stored in the memory 2904 to perform the following steps:

acquiring, by using the input apparatus 2900, a public key operation value of a second device in an out-of-band manner, where the public key operation value of the second device is a value obtained by performing a preset-algorithm operation on a public key of the second device; sending, by using the output apparatus 2902, public key information of a first device to the second device, so that the second device obtains a public key of the first device according to the public key information of the first device; receiving, by using the input apparatus 2900, public key information of the second device that is encrypted by using the public key of the first device and sent by the second device, and decrypting the public key information of the second device by using a private key of the first device, to obtain the public key of the second device; and performing a preset-algorithm operation on the public key of the second device to obtain a copy of the public key operation value of the second device, and after the copy of the public key operation value of the second device matches the public key operation value of the second device, accepting connection information that is sent by the second device and received by the input apparatus 2900, or generating connection information and sending the connection information to the second device by using the output apparatus 2902.

Specifically, when receiving the public key information of the second device that is encrypted by using the public key of the first device and sent by the second device, the input apparatus 2900 further receives signature verification information sent by the second device, where the signature verification information is information obtained by the second device by performing asymmetric encryption by using a private key of the second device.

More specifically, after the copy of the public key operation value of the second device matches the public key operation value of the second device, the processor 2906 further performs:

verifying the signature verification information by using the public key of the second device; and if the verification succeeds, performing the step of accepting connection information that is sent by the second device and received by the input apparatus 2900, or generating connection information and sending the connection information to the second device by using the output apparatus 2902; or if the verification fails, terminating a connection process.

More specifically, the public key information of the first device includes the public key of the first device, or information obtained by performing symmetric encryption on the public key of the first device by using the public key operation value of the second device.

More specifically, before the sending, by using the output apparatus 2902, public key information of a first device to the second device, the processor 2906 further performs: acquiring, by using the input apparatus 2900, random password information of the second device in the out-of-band manner;

the public key information of the first device includes the public key of the first device, or information obtained by performing symmetric encryption on the public key of the first device by using the public key operation value of the second device, or information obtained by performing symmetric encryption on the public key of the first device by using the public key operation value of the second device and the random password information of the second device, or information obtained by performing symmetric encryption on the public key of the first device by using the random password information of the second device.

More specifically, when the public key information of the second device is received by using the input apparatus 2900, the connection information generated by the second device is further received by using the input apparatus 2900, where asymmetric encryption is performed on the connection information by using the public key of the first device; and the accepting connection information that is sent by the second device and received by using the input apparatus 2900 includes: decrypting the connection information by using the private key of the first device.

More specifically, after the processor 2906 receives, by using the input apparatus 2900, the public key information of the second device that is encrypted by using the public key of the first device and sent by the second device, the processor 2906 further includes: receiving, by using the input apparatus 2900, the connection information sent by the second device, where asymmetric encryption is performed on the connection information by using the public key of the first device; and that the processor accepts connection information that is sent by the second device and received by using the input apparatus 2900 includes: decrypting the connection information by using the private key of the first device.

More specifically, after the copy of the public key operation value of the second device matches the public key operation value of the second device, and before the connection information sent by the second device is received by using the input apparatus 2900, the processor 2906 further performs:

using the public key of the second device to perform an asymmetric encryption operation on the public key operation value of the second device or on a signature that is generated by using the private key of the first device, to generate a first verification message, and sending the first verification message to the second device by using the output apparatus 2902, so that the second device sends the connection information after successfully verifying the first verification message.

More specifically, after the processor 2906 receives the public key information of the second device that is encrypted by using the public key of the first device and sent by the second device, the processor 2906 further includes: receiving, by using the input apparatus 2900, the connection information sent by the second device, where asymmetric encryption is performed on the connection information by using the public key of the first device; and that the processor accepts connection information that is sent by the second device and received by using the input apparatus 2900 includes: decrypting the connection information by using the private key of the first device.

More specifically, after the copy of the public key operation value of the second device matches the public key operation value of the second device, and before the connection information sent by the second device is received by using the input apparatus 2900, the processor 2906 further performs:

using the public key of the second device to perform an asymmetric encryption operation on the public key operation value of the second device and/or on the random password information of the second device to generate a second verification message, or using the public key of the second device to perform an asymmetric encryption operation on a signature that is generated by using the private key of the first device, to generate a second verification message, and sending the second verification message to the second device by using the output apparatus 2902, so that the second device sends the connection information after successfully verifying the second verification message.

More specifically, the processor 2906 further performs acquiring, by using the input apparatus 2900, a public key operation value of a third device in the out-of-band manner, where the public key operation value of the third device is a value obtained by performing a preset-algorithm operation on a public key of the third device; and after completing a network connection with the second device, sending, by using the output apparatus 2902, the public key operation value of the third device to the second device, so that the second device performs a network connection with the third device.

The network device 290 in this embodiment of the present invention may be, for example, a network management device, a router, a transmission node, an intelligent mobile terminal, or another network device.

It is understandable that functions of functional modules in the network device 290 may be implemented specifically according to the methods in the foregoing method embodiments and are not further described herein.

Figure 30:
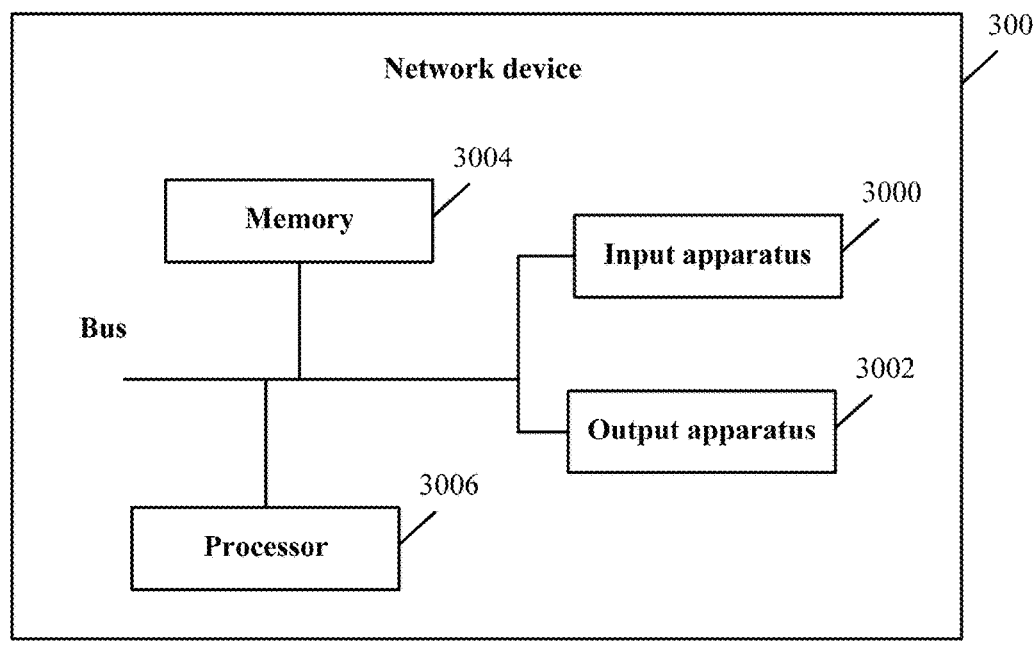
FIG. 30 is a schematic structural diagram of a second embodiment of a network device according to the present invention.

To better implement the foregoing solutions of the embodiments of the present invention, the present invention further provides a related device for cooperating in implementing the foregoing solutions. FIG. 30 shows a schematic structural diagram of a second embodiment of a network device according to the present invention. The following describes the network device in detail with reference to FIG. 30.

The network device 300 includes an input apparatus 3000, an output apparatus 3002, a memory 3004, and a processor 3006 (a quantity of processors 3006 in the network device may be one or more, and one processor is used as an example in FIG. 30). In some embodiments of the present invention, the input apparatus 3000, the output apparatus 3002, the memory 3004 and the processor 3006 may be connected by using a bus or in other manners, where the connection by using a bus is used as an example in FIG. 30.

The memory 3004 is configured to store program code, and the processor 3006 is configured to invoke the program code stored in the memory 3004 to perform the following steps:

generating a public key operation value of a second device, for acquisition by a first device in an out-of-band manner, where the public key operation value of the second device is a value obtained by performing a preset-algorithm operation on a public key of the second device; receiving, by using the input apparatus 3000, public key information of the first device that is sent by the first device, acquiring a public key of the first device from the public key information of the first device, and performing asymmetric encryption on the public key of the second device by using the public key of the first device, to generate public key information of the second device; and sending, by using the output apparatus 3002, the public key information of the second device to the first device, so that after the first device obtains the public key of the second device, the first device performs a preset-algorithm operation on the public key of the second device to obtain a copy of the public key operation value of the second device, and that when the copy of the public key operation value of the second device matches the public key operation value of the second device, the first device accepts connection information sent by the second device and received by the input apparatus 3000, or generates connection information and sends the connection information to the second device by using the output apparatus 3002.

Specifically, when sending the public key information of the second device by using the output apparatus 3002, the processor 3006 further sends signature verification information generated according to a private key of the second device, so that after the first device detects that the copy of the public key operation value of the second device matches the public key operation value of the second device, the first device verifies the signature verification information by using the public key of the second device.

More specifically, that the processor 3006 acquires a public key of the first device from the public key information of the first device includes:

when the public key information of the first device is the public key of the first device, directly acquiring the public key of the first device; and when the public key information of the first device is information obtained by the first device by performing symmetric encryption on the public key of the first device by using the public key operation value of the second device, decrypting the public key information of the first device according to the public key operation value of the second device to acquire the public key of the first device.

More specifically, before the processor 3006 receives, by using the input apparatus 3000, the public key information of the first device that is sent by the first device, the processor 3006 further performs: generating random password information of the second device, for acquisition by the first device in the out-of-band manner.

More specifically, that the processor 3006 acquires a public key of the first device from the public key information of the first device includes:

when the public key information of the first device is the public key of the first device, directly acquiring the public key of the first device; when the public key information of the first device is information obtained by the first device by performing symmetric encryption on the public key of the first device by using the public key operation value of the second device, decrypting the public key information of the first device according to the public key operation value of the second device to acquire the public key of the first device; when the public key information of the first device is information obtained by the first device by performing symmetric encryption on the public key of the first device by using the random password information of the second device, decrypting the public key information of the first device according to the random password information of the second device to acquire the public key of the first device; and when the public key information of the first device is information obtained by the first device by performing symmetric encryption on the public key of the first device by using the public key operation value of the second device and the random password information of the second device, decrypting the public key information of the first device according to the public key operation value of the second device and the random password information of the second device to acquire the public key of the first device.

More specifically, when sending the public key information of the second device to the first device by using the output apparatus 3002, the processor 3006 further sends the connection information, where asymmetric encryption is performed on the connection information by using the public key of the first device.

More specifically, after the processor 3006 sends the public key information of the second device to the first device by using the output apparatus 3002, the processor 3006 further performs:

generating the connection information, where asymmetric encryption is performed on the connection information by using the public key of the first device; and sending the connection information to the first device by using the output apparatus 3002.

More specifically, after the processor 3006 sends the public key information of the second device to the first device by using the output apparatus 3002, and before the processor 3006 generates the connection information, the processor 3006 further performs:

receiving, by using the input apparatus 3000, a first verification message sent by the first device, where the first verification message is generated by the first device by performing an asymmetric encryption operation on the public key operation value of the second device by using the public key of the second device; and after successfully verifying the first verification message according to the private key of the second device, performing the step of generating the connection information; and confirming that the connection information takes effect.

More specifically, after the processor 3006 sends the public key information of the second device to the first device by using the output apparatus 3002, the processor 3006 further performs:

generating the connection information, where asymmetric encryption is performed on the connection information by using the public key of the first device; and sending the connection information to the first device by using the output apparatus 3002.

More specifically, after the processor 3006 sends the public key information of the second device to the first device by using the output apparatus 3002, the processor 3006 further performs:

generating the connection information, where asymmetric encryption is performed on the connection information by using the public key of the first device; and sending the connection information to the first device by using the output apparatus 3002.

More specifically, after completing a network connection with the first device, the processor 3006 receives, by using the input apparatus 3000, a public key operation value of a third device that is sent by the first device, where the public key operation value of the third device is a value obtained by performing a preset-algorithm operation on a public key of the third device; and performs a network connection with the third device.

Figure 31:
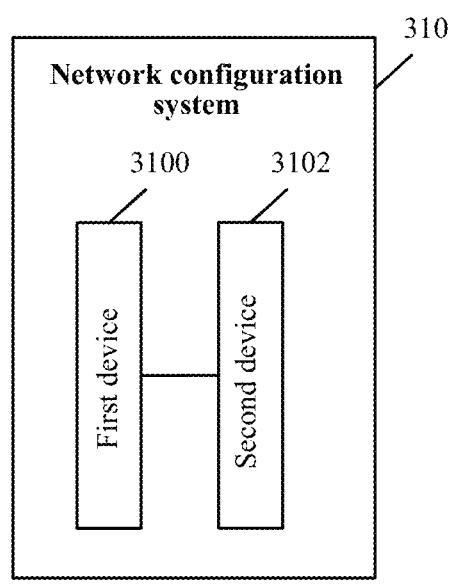
FIG. 31 is a schematic structural diagram of a network connection system according to an embodiment of the present invention.

To better implement the foregoing solutions of the embodiments of the present invention, the present invention further provides a related system for cooperating in implementing the foregoing solutions. FIG. 31 shows a schematic structural diagram of a network connection system according to an embodiment of the present invention. The following describes the system in detail with reference FIG. 31.

The network connection system 310 includes a first device 3100 and a second device 3102.

The first device 3100 is not further described herein, and for details, reference is made to the network device 290 in the foregoing embodiment in FIG. 29.

The second device 3102 is not further described herein, and for details, reference is made to the network device 300 in the foregoing embodiment in FIG. 30.

It should be noted that in some network connection scenarios, when two devices are both UI-restricted devices, one device cannot obtain a public key operation value of the other device securely; in this case, a third-party device is required to assist in configuring and connecting the two devices to be configured and connected; that is, the network connection system 310 may further include a third device, where the first device 3100 is a third-party device, and the second device 3102 and the third device may both be UI-restricted devices that require the first device 3100 to assist in a configuration and connection. The detailed configuration and connection manner is not further described herein, and for details, reference may be made to the implementation manner in the foregoing method embodiments.

In summary, by implementing the embodiments of the present invention, an operation is performed on a public key to obtain a public key operation value, and the public key operation value is used to replace a complete public key in information exchanged in a connection process, which can reduce content of exchanged information, improve utilization of an out-of-band channel connecting two devices, and improve security of the connection process; when a network connection is performed by scanning a multi-dimensional code, encoded content of the multi-dimensional code can be reduced greatly, requirements on displaying, scanning, and decoding of the multi-dimensional code are reduced, applicability is high, and connection efficiency is improved greatly, which greatly improve connection experience of a user; in addition, a connection can be performed by using the public key operation value with reference to random password information, which improves security of the connection process greatly.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A secure connection method for a network device, the method comprising:
   acquiring, by a first device, a first public key operation value of a second device that is encoded in a dynamic multi-dimensional code and transmitted from the second device to the first device in an out-of-band manner, wherein the first public key operation value of the second device is a value generated by the second device by performing a preset-algorithm operation on a public key of the second device;
   sending, by the first device, public key information of the first device to the second device, the public key information of the first device enabling the second device to obtain a public key of the first device according to the public key information of the first device;
   receiving, by the first device, public key information of the second device that is encrypted by using the public key of the first device and sent by the second device, and decrypting the encrypted public key information of the second device by using a private key of the first device, to obtain the public key of the second device;
   performing, by the first device, a preset-algorithm operation on the public key of the second device to obtain a second public key operation value of the second device, and when the second public key operation value of the second device matches the first public key operation value of the second device, using the public key of the second device to perform an asymmetric encryption operation on the first public key operation value of the second device or on a signature that is generated by using the private key of the first device, generating and sending a first verification message to the second device, and accepting received connection information sent by the second device for establishing secure wireless communication, wherein the connection information is sent by the second device after the second device successfully verifies the first verification message; and
   wherein the public key information of the first device comprises the public key of the first device, or information obtained by performing symmetric encryption on the public key of the first device by using the first public key operation value of the second device.

2. The method according to claim 1, wherein:
   when receiving the public key information of the second device that is encrypted by using the public key of the first device and sent by the second device, the first device further receives signature verification information sent by the second device, wherein the signature verification information is information obtained by the second device by performing asymmetric encryption by using a private key of the second device; and
   after the second public key operation value of the second device matches the first public key operation value of the second device, the method further comprises:

verifying the signature verification information by using the public key of the second device, and if the verification succeeds, performing the step of accepting received connection information sent by the second device, or generating connection information and sending the connection information to the second device; or if the verification fails, terminating a connection process.

3. The method according to claim 1, wherein before sending, by the first device, public key information of the first device to the second device, the method further comprises:

acquiring, by the first device, random password information of the second device in the out-of-band manner, wherein the public key information of the first device comprises the public key of the first device, or information obtained by performing symmetric encryption on the public key of the first device by using the first public key operation value of the second device, or information obtained by performing symmetric encryption on the public key of the first device by using the first public key operation value of the second device and the random password information of the second device, or information obtained by performing symmetric encryption on the public key of the first device by using the random password information of the second device.

4. The method according to claim 1, wherein:

when receiving the public key information of the second device that is encrypted by using the public key of the first device and sent by the second device, the first device further receives the connection information generated by the second device, wherein asymmetric encryption is performed on the connection information by using the public key of the first device; and accepting received connection information sent by the second device comprises:

decrypting the connection information by using the private key of the first device.

5. The method according to claim 1, wherein:

after receiving, by the first device, public key information of the second device that is encrypted by using the public key of the first device and sent by the second device, the method further comprises:

receiving, by the first device, the connection information sent by the second device, wherein asymmetric encryption is performed on the connection information by using the public key of the first device; and accepting received connection information sent by the second device comprises:

decrypting the connection information by using the private key of the first device.

6. The method according to claim 3, wherein:

after the receiving, by the first device, public key information of the second device that is encrypted by using the public key of the first device and sent by the second device, the method further comprises:

receiving, by the first device, the connection information sent by the second device, wherein asymmetric encryption is performed on the connection information by using the public key of the first device; and accepting received connection information sent by the second device comprises:

decrypting the connection information by using the private key of the first device.

7. The method according to claim 6, wherein after the second public key operation value of the second device matches the first public key operation value of the second device, and before the connection information sent by the second device is received, the method further comprises:

using the public key of the second device to perform an asymmetric encryption operation on at least one of the first public key operation value of the second device or the random password information of the second device to generate a second verification message, or using the public key of the second device to perform an asymmetric encryption operation on a signature that is generated by using the private key of the first device, to generate a second verification message; and sending the second verification message to the second device, the second verification message enabling the second device to send the connection information after successfully verifying the second verification message.

8. The method according to claim 1, further comprising:

acquiring, by the first device, a public key operation value of a third device in the out-of-band manner, wherein the public key operation value of the third device is a value obtained by performing a preset-algorithm operation on a public key of the third device; and after completing a network connection with the second device, sending the public key operation value of the third device to the second device, the public key operation value of the third device enabling the second device to perform a network connection with the third device.

9. A secure connection method for a network device, the method comprising:

generating, by a second device, a first public key operation value of the second device that is encoded in a dynamic multi-dimensional code, for acquisition by a first device in an out-of-band manner, wherein the first public key operation value of the second device is a value obtained by performing a preset-algorithm operation on a public key of the second device;

receiving, by the second device, public key information of the first device that is sent by the first device;

acquiring, by the second device, a public key of the first device from the public key information of the first device;

performing, by the second device, asymmetric encryption on the public key of the second device by using the public key of the first device, to generate public key information of the second device;

sending, by the second device, the public key information of the second device to the first device, the public key information of the second device enabling the first device to perform, after obtaining the public key of the second device, a preset-algorithm operation on the public key of the second device to obtain a second public key operation value of the second device;

when the second public key operation value of the second device matches the first public key operation value of the second device, receiving, by the second device, a first verification message sent by the first device, wherein the first verification message is generated by the first device by performing asymmetric encryption on the first public key operation value of the second device using the public key of the second device and accepting received connection information sent by the second device for establishing secure wireless communication;

generating and sending, by the second device, the connection information after successfully verifying the first verification message from the first device according to a private key of the second device; and wherein acquiring a public key of the first device from the public key information of the first device comprises:
when the public key information of the first device is the public key of the first device, directly acquiring the public key of the first device, and
when the public key information of the first device is information obtained by the first device by performing symmetric encryption on the public key of the first device by using the first public key operation value of the second device, decrypting the public key information of the first device according to the first public key operation value of the second device to acquire the public key of the first device.

10. The method according to claim 9, wherein acquiring a public key of the first device from the public key information of the first device comprises:
when the public key information of the first device is the public key of the first device, directly acquiring the public key of the first device;
when the public key information of the first device is information obtained by the first device by performing symmetric encryption on the public key of the first device by using the first public key operation value of the second device, decrypting the public key information of the first device according to the first public key operation value of the second device to acquire the public key of the first device;
when the public key information of the first device is information obtained by the first device by performing symmetric encryption on the public key of the first device by using random password information of the second device, decrypting the public key information of the first device according to the random password information of the second device to acquire the public key of the first device; and
when the public key information of the first device is information obtained by the first device by performing symmetric encryption on the public key of the first device by using the first public key operation value of the second device and the random password information of the second device, decrypting the public key information of the first device according to the first public key operation value of the second device and the random password information of the second device to acquire the public key of the first device.

11. A network device, comprising:
an input apparatus and an output apparatus;
a processor; and
a memory coupled to the processor and configured to store program code which, when executed by the processor, causes the network device to:
acquire, by using the input apparatus, a first public key operation value of a second device that is encoded in a dynamic multi-dimensional code and transmitted from the second device to a first device in an out-of-band manner, wherein the first public key operation value of the second device is a value generated by the second device by performing a preset-algorithm operation on a public key of the second device,
send, by using the output apparatus, public key information of the first device to the second device, the public key information of the first device enabling the second device to obtain a public key of the first device according to the public key information of the first device,
receive, by using the input apparatus, public key information of the second device that is encrypted by using the public key of the first device and sent by the second device, and decrypt the public key information of the second device by using a private key of the first device, to obtain the public key of the second device,
perform a preset-algorithm operation on the public key of the second device to obtain a second public key operation value of the second device, and after the second public key operation value of the second device matches the first public key operation value of the second device, use the public key of the second device to perform an asymmetric encryption operation on the first public key operation value of the second device or on a signature that is generated by using the private key of the first device, generate and send a first verification message to the second device, and accept connection information that is sent by the second device for establishing secure wireless communication, wherein the connection information is sent by the second device after the second device successfully verifies the first verification message, and
wherein the public key information of the first device comprises the public key of the first device, or information obtained by performing symmetric encryption on the public key of the first device by using the first public key operation value of the second device.

12. The network device according to claim 11, wherein:
to receive, by using the input apparatus, the public key information of the second device that is encrypted by using the public key of the first device and sent by the second device, the program code, when executed by the processor, further causes the network device to:
receive, by using the input apparatus, signature verification information sent by the second device, wherein the signature verification information is information obtained by the second device by performing asymmetric encryption by using a private key of the second device;
after the second public key operation value of the second device matches the first public key operation value of the second device, the program code, when executed by the processor, further causes the network device to:
verify the signature verification information by using the public key of the second device, and
if the verification succeeds, accept connection information that is sent by the second device and received by the input apparatus, or generate connection information and send the connection information to the second device by using the output apparatus, or if the verification fails, terminate a connection process.

13. The network device according to claim 11, wherein before the public key information of the first device is sent to the second device by using the output apparatus, the program code, when executed by the processor, further causes the network device to:
acquire, by using the input apparatus, random password information of the second device in the out-of-band manner, wherein the public key information of the first device comprises the public key of the first device, or information obtained by performing symmetric encryption on the public key of the first device by using the first public key operation value of the second device, or information obtained by performing symmetric encryption on the public key of the first device by using the first public key operation value of the second device and the random password information of the second device, or information obtained by performing symmetric encryption on the public key of the first device by using the random password information of the second device.

14. A network device, comprising:

an input apparatus and an output apparatus;

a processor; and a memory coupled to the processor and configured to store program code which, when executed by the processor, causes the network device to:

generate a first public key operation value of a second device that is encoded in a dynamic multi-dimensional code, for acquisition by a first device in an out-of-band manner, wherein the first public key operation value of the second device is a value obtained by performing a preset-algorithm operation on a public key of the second device, receive, by using the input apparatus, public key information of the first device that is sent by the first device, acquire a public key of the first device from the public key information of the first device, perform asymmetric encryption on the public key of the second device by using the public key of the first device, to generate public key information of the second device, send, by using the output apparatus, the public key information of the second device to the first device, the public key information of the second device enabling the first device to perform, after obtaining the public key of the second device, a preset-algorithm operation on the public key of the second device to obtain a second public key operation value of the second device, when the second public key operation value of the second device matches the first public key operation value of the second device, receive a first verification message sent by the first device, wherein the first verification message is generated by the first device by performing asymmetric encryption on the first public key operation value of the second device using the public key of the second device and accepting connection information sent by the second device for establishing secure wireless communication, generate and send the connection information after successfully verifying the first verification message from the first device according to a private key of the second device, and wherein to acquire a public key of the first device from the public key information of the first device, the processor is further configured to invoke and execute the program code stored in the memory, and when executed, causes the processor to:

when public key information of the first device is the public key of the first device, directly acquire the public key of the first device; and when the public key information of the first device is information obtained by the first device by performing symmetric encryption on the public key of the first device by using the first public key operation value of the second device, decrypt the public key information of the first device according to the first public key operation value of the second device to acquire the public key of the first device.

15. The network device according to claim 14, wherein the program code, when executed by the processor, further causes the network device to:

when the public key information of the first device is the public key of the first device, directly acquire the public key of the first device;

when the public key information of the first device is information obtained by the first device by performing symmetric encryption on the public key of the first device by using the first public key operation value of the second device, decrypt the public key information of the first device according to the first public key operation value of the second device to acquire the public key of the first device;

when the public key information of the first device is information obtained by the first device by performing symmetric encryption on the public key of the first device by using random password information of the second device, decrypt the public key information of the first device according to the random password information of the second device to acquire the public key of the first device; and when the public key information of the first device is information obtained by the first device by performing symmetric encryption on the public key of the first device by using the first public key operation value of the second device and the random password information of the second device, decrypt the public key information of the first device according to the first public key operation value of the second device and the random password information of the second device to acquire the public key of the first device.

* * * * *